United States Patent
Nakayama et al.

(10) Patent No.: US 12,212,251 B2
(45) Date of Patent: Jan. 28, 2025

(54) POWER CONVERSION DEVICE HAVING CONVERTER CELLS CONNECTED IN SERIES IN A MULTIPLEXED MANNER AND EACH INCLUDING AN ENERGY STORAGE ELEMENT

(71) Applicant: Mitsubishi Electric Corporation, Tokyo (JP)

(72) Inventors: Akito Nakayama, Tokyo (JP); Takuya Kajiyama, Tokyo (JP); Takushi Jimichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 126 days.

(21) Appl. No.: 17/794,987

(22) PCT Filed: Mar. 30, 2020

(86) PCT No.: PCT/JP2020/014531
§ 371 (c)(1),
(2) Date: Jul. 25, 2022

(87) PCT Pub. No.: WO2021/199149
PCT Pub. Date: Oct. 7, 2021

(65) Prior Publication Data
US 2023/0041013 A1 Feb. 9, 2023

(51) Int. Cl.
*H02M 7/797* (2006.01)
*H02M 1/00* (2007.01)

(52) U.S. Cl.
CPC ......... *H02M 7/797* (2013.01); *H02M 1/0043* (2021.05)

(58) Field of Classification Search
CPC .. H02M 7/797; H02M 1/0043; H02M 7/4835; H02M 7/49; H02M 7/4833
See application file for complete search history.

(56) References Cited

U.S. PATENT DOCUMENTS

2016/0139578 A1* 5/2016 Hasler .................. G05B 19/106
                                                                 700/295
2016/0211792 A1* 7/2016 Yamakawa ............. H02M 1/15

FOREIGN PATENT DOCUMENTS

CN         105790619 A   *   7/2016
EP           3176934 A1  *   6/2017   ............. H02M 1/12
(Continued)

OTHER PUBLICATIONS

Extended European Search Report issued Apr. 3, 2023 in corresponding European Patent Application No. 20929010.5, 9 pages.
(Continued)

*Primary Examiner* — Thienvu V Tran
*Assistant Examiner* — Yahveh Comas Torres
(74) *Attorney, Agent, or Firm* — XSENSUS LLP

(57) ABSTRACT

A power conversion device includes: a power converter including, for respective phases of AC, leg circuits each including a pair of arms connected in series, the arms including a plurality of converter cells which are connected in series and each of which has an energy storage element and a plurality of semiconductor elements, the leg circuits being connected in parallel between positive and negative DC terminals, the power converter being configured to perform power conversion between multiphase AC and DC; and a control unit. The control unit corrects an AC voltage command value for controlling AC voltage of the power converter, by a zero-phase-sequence voltage command value having a set amplitude and a set phase, and performs adjustment control for adjusting at least either the amplitude or the phase of the zero-phase-sequence voltage command value on the basis of electric energy variation in the arm.

20 Claims, 25 Drawing Sheets

(56) References Cited

FOREIGN PATENT DOCUMENTS

| EP | 3188356 A1 | * | 7/2017 | ............ H02M 7/487 |
|---|---|---|---|---|
| JP | 2006-101621 A | | 4/2006 | |
| JP | 2017-153355 A | | 8/2017 | |
| JP | 2018-14860 A | | 1/2018 | |
| JP | 2018196237 A | * | 12/2018 | |
| WO | WO-2014198308 A1 | * | 12/2014 | ........... G05B 19/042 |
| WO | 2015/025437 A1 | | 2/2015 | |
| WO | WO-2018211624 A1 | * | 11/2018 | ............... G05F 1/70 |

OTHER PUBLICATIONS

Dong Yufei et al: "Capacitor Voltage Balance Control of Hybrid Modular Multilevel Converters With Second—Order Circulating Current Injection", IEEE Journal of Emerging and Selected Topics in Power Electronics, IEEE, Piscataway, NJ, USA, vol. 7, No. 1, Mar. 1, 2019 (Mar. 1, 2019), pp. 157-167, XP011709835, ISSN: 2168-6777, DOI: 10.1109/JESTPE.2018.2879915 [retrieved on Feb. 8, 2019].

International Search Report and Written Opinion mailed on Jun. 30, 2020, received for PCT Application PCT/JP2020/014531, filed on Mar. 30, 2020, 10 pages including English Translation.

Office Action issued on Sep. 3, 2024, in corresponding European patent Application No. 20929010.5, 5 pages.

\* cited by examiner

FIG. 9  REFERENCE EXAMPLE 1

FIG. 10 REFERENCE EXAMPLE 2

FIG. 12 REFERENCE EXAMPLE 4

POWER CONVERSION DEVICE HAVING CONVERTER CELLS CONNECTED IN SERIES IN A MULTIPLEXED MANNER AND EACH INCLUDING AN ENERGY STORAGE ELEMENT

CROSS-REFERENCE TO RELATED APPLICATION

The present application is based on PCT filing PCT/JP2020/014531, filed Mar. 30, 2020, the entire contents of which is incorporated herein by reference.

TECHNICAL FIELD

The present disclosure relates to a power conversion device.

BACKGROUND ART

In recent years, in power conversion devices used for high-voltage application such as a power grid, a multilevel converter in which a plurality of converter cells each including an energy storage element are connected in series in a multiplexed manner, has been put into practice. Such a converter is called a modular multilevel converter (MMC) type, a cascaded multilevel converter (CMC) type, or the like.

Meanwhile, in a power conversion device that converts multiphase AC, specifically, three-phase AC, using a general inverter/converter not having a configuration in which a plurality of converter cells are connected in series in a multiplexed manner as described above, in order to increase the voltage usage ratio thereof and reduce the size of a smoothing capacitor, a zero-phase-sequence voltage command value is superimposed on an output voltage command value as follows.

That is, an electric motor control device as a conventional power conversion device has phase arms each including a p-side switching element and an n-side switching element. The arms are connected in parallel between a positive line and a negative line. An intermediate point between the p-side switching element and the lower-side switching element of each arm is connected to each phase of a motor-generator. The electric motor control device adds a third-order harmonic signal to a phase voltage command signal that prescribes operation of the motor-generator (see, for example, Patent Document 1).

However, in a case where the same control as in Patent Document 1 is applied to a multilevel converter in which a plurality of converter cells each including an energy storage element are connected in series in a multiplexed manner, the voltage usage ratio might not be successfully improved.

CITATION LIST

Patent Document

Patent Document 1: WO2015/025437

SUMMARY OF THE INVENTION

Problems to be Solved by the Invention

The present disclosure has been made to solve the above problem, and an object of the present disclosure is to provide a power conversion device that improve the voltage usage ratio even in a case of using a converter in which a plurality of converter cells each including an energy storage element are connected in series in a multiplexed manner.

Solution to the Problems

A power conversion device according to the present disclosure includes: a power converter including, for respective phases of AC, leg circuits each including a pair of arms connected in series to each other, the arms each including a plurality of converter cells which are connected in series and each of which has a storage element and a plurality of semiconductor elements, the leg circuits being connected in parallel between positive and negative DC terminals, the power converter being configured to perform power conversion between multiphase AC and DC; and a control unit for controlling the power converter. The control unit corrects an AC voltage command value for controlling AC voltage of the power converter, by a zero-phase-sequence voltage command value having a set amplitude and a set phase, and generates an arm modulation command for each arm on the basis of the corrected AC voltage command value and a DC voltage command value for controlling DC voltage of the power converter, to control each converter cell in the arm. The control unit performs adjustment control for adjusting at least either the amplitude or the phase of the zero-phase-sequence voltage command value on the basis of electric energy variation in the arm.

Effect of the Invention

The ower conversion device according to the present disclosure can improve the voltage usage ratio even in a case of using a converter in which a plurality of converter cells each including an energy storage element are connected in series in a multiplexed manner.

DESCRIPTION OF EMBODIMENTS

Embodiment 1

Figure 1:
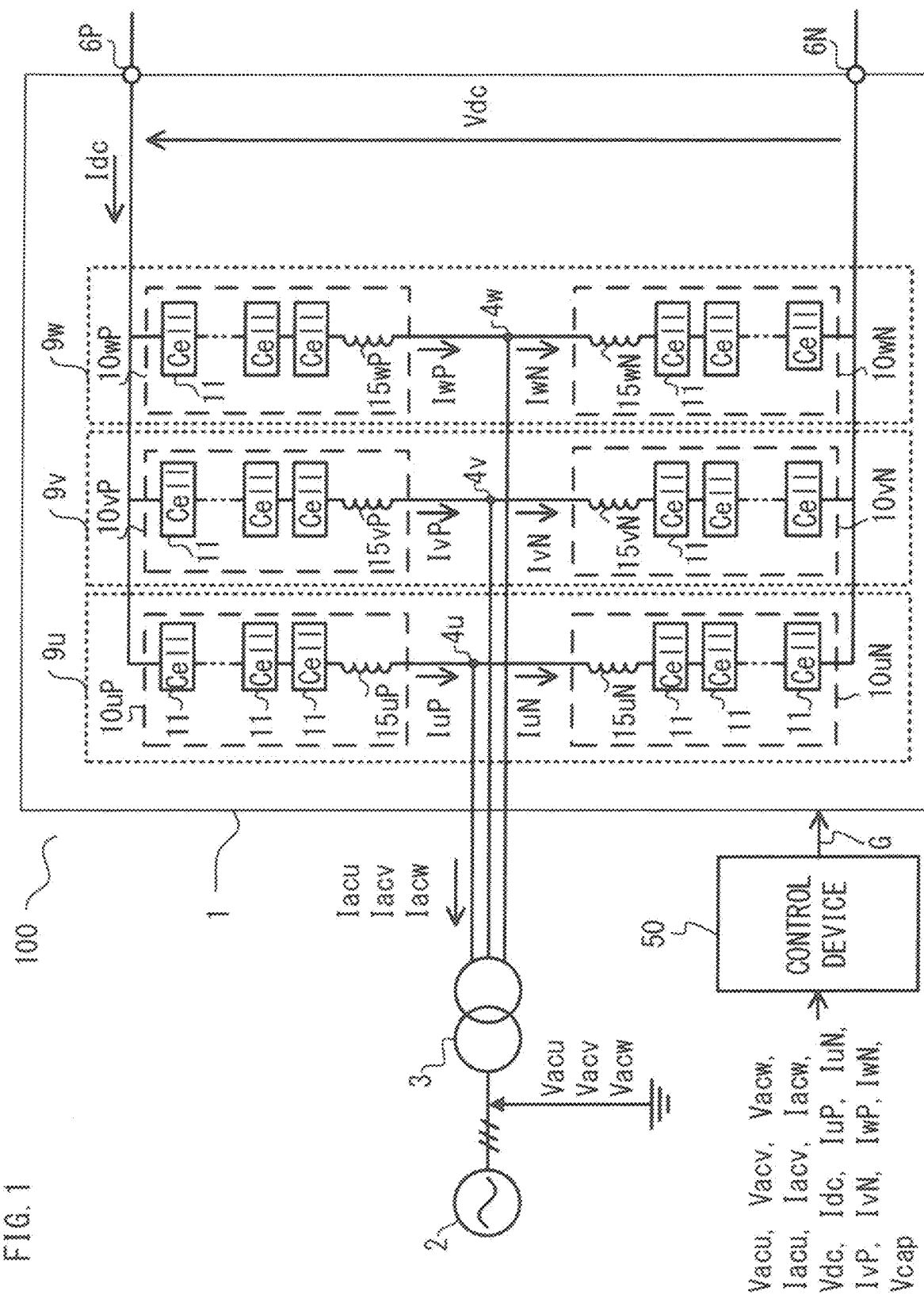
FIG. 1 shows a schematic configuration of an example of a power grid to which a power conversion device according to embodiment 1 is applied.

FIG. 1 shows a schematic configuration of an example of a power grid to which a power conversion device 100 according to embodiment 1 is applied.

As shown in FIG. 1, the power conversion device 100 includes a power converter 1 which is a main circuit, and a control device 50 as a control unit for controlling the power converter 1.

The power converter 1 performs power conversion between AC and DC. The AC side thereof is connected to an AC power supply 2 which is a three-phase AC grid as multiphase AC via a transformer 3. The DC side of the power converter 1 is connected to a DC grid (not shown) via a positive-side DC terminal 6P and a negative-side DC terminal 6N.

The DC grid is, for example, a DC power supply such as a large-scale photovoltaic system or an industrial uninterruptible power supply (UPS), another power converter, or the like.

The power converter 1 includes three leg circuits 9$u$, 9$v$, 9$w$ provided respectively for u phase, v phase, and w phase of three-phase AC and connected in parallel between the positive-side DC terminal 6P and the negative-side DC terminal 6N.

The leg circuit 9$o$ includes a positive-side arm 10$u$P and a negative-side arm 10$u$N as a pair of arms, and the positive-side arm 10$u$P and the negative-side arm 10$u$N are connected in series to each other.

One end of the positive-side arm 10$u$P is connected to the positive-side DC terminal 6P, and one end of the negative-side arm 10$u$N is connected to the negative-side DC terminal 6N. A connection point 4$u$ between the positive-side arm 10$u$P and the negative-side arm 10$u$N is connected to a u-phase terminal of the transformer 3.

The leg circuit 9$v$ includes a positive-side arm 10$v$P and a negative-side arm 10$v$N as a pair of arms, and the positive-side arm 10$v$P and the negative-side arm 10$v$N are connected in series to each other.

One end of the positive-side arm 10$v$P is connected to the positive-side DC terminal 6P, and one end of the negative-side arm 10$v$N is connected to the negative-side DC terminal 6N. A connection point 4$v$ between the positive-side arm 10$v$P and the leg ide arm 10$v$N is connected to a v phase terminal of the 3.

The leg circuit 9$w$ includes a positive-side arm 10$w$P and a negative-side arm 10$w$N as a pair of arms, and the positive-side arm 10$w$P and the negative-side arm 10$w$N are connected in series to each other.

One end of the positive-side arm 10$w$P is connected to the positive-side DC terminal 6P, and one end of the negative-side arm 10$w$N is connected to the negative-side DC terminal 6N. A connection point 4$w$ between the positive-side arm 10$w$P and the negative-side arm 10$w$N is connected to a w phase terminal of the transformer 3.

Hereinafter, a configuration of each leg circuit 9$u$, 9$v$, 9$w$ will be described.

The leg circuits 9$v$, 9$w$ for v phase and w phase have the same configuration as the leg circuit 9$u$ for u phase. Therefore, the leg circuit 9$u$ for u phase will be described as a representative.

The positive-side arm 10$u$P of the leg circuit 9$u$ includes a plurality of converter cells 11 connected in series and a reactor 15$u$P, and the plurality of converter cells 11 and the reactor 15$u$P are connected in series to each other.

Similarly, the negative-side arm 10$u$N of the leg circuit 9$u$ includes a plurality of converter cells 11 connected in series and a reactor 15$u$N, and the converter cells 11 and the reactor 15$u$N are connected in series to each other.

The reactor 15$u$P may be provided at any position within the positive-side arm 10$u$P, and similarly, the reactor. 15$u$N may be provided at any position within the negative-side arm 10$u$N. The inductance values of the reactors 15$u$P, 15$u$N may be different from each other and may be coupled with reactors for another phase. A configuration in which the reactor 15$u$P is provided only in the positive-side arm 10$u$P may be adopted, or a configuration in which the reactor 15$u$N is provided only in the negative-side arm 10$u$N may be adopted.

In the following description, when the positive-side arms 10$u$P, 10$v$P, 10$w$P and the negative-side arms 10$u$N, 10$v$N, 10$w$N need not be discriminated from each other, they are referred to as arms 10, or positive-side arms 10P and negative-side arms 10N.

Figure 2:
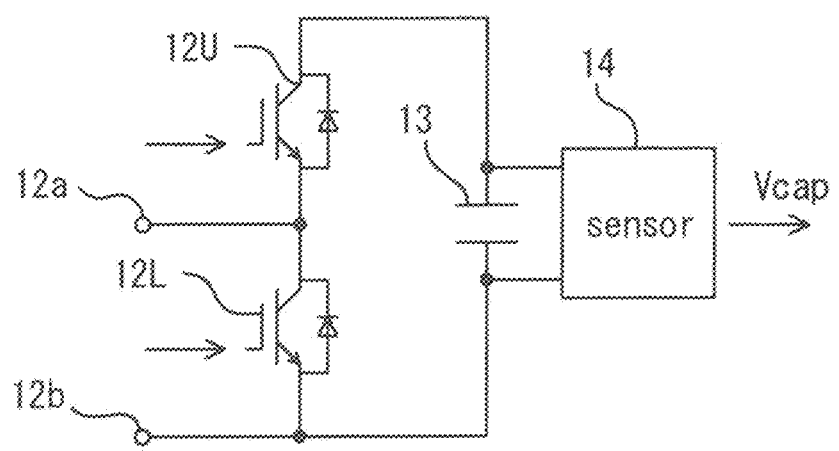
FIG. 2 is a circuit diagram showing an example of a configuration of a converter cell according to embodiment 1.

Hereinafter, a configuration of each converter cell 11 composing the leg circuits 9$u$, 9$v$, 9$w$ will be described, FIG. 2 is a circuit diagram showing an example of a configuration of the converter cell 11 according to embodiment 1.

Figure 3:
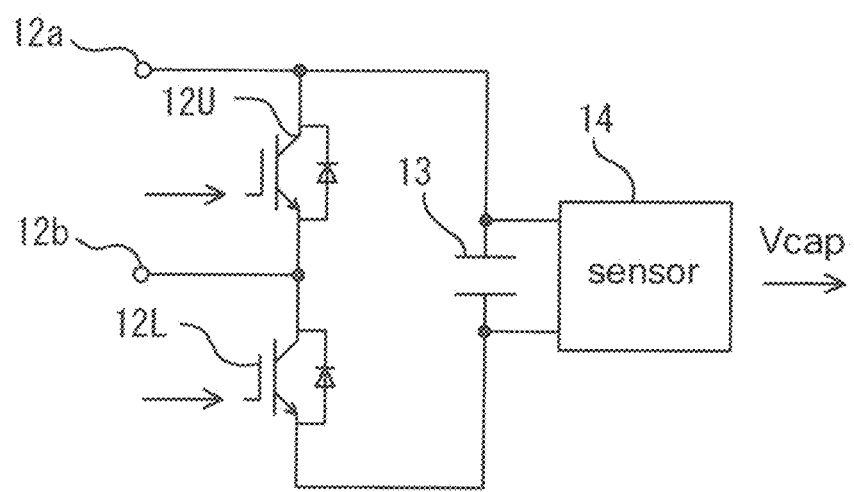
FIG. 3 is a circuit diagram showing an example of a configuration of a converter cell according to embodiment 1.

FIG. 3 is a circuit diagram showing another configuration example of the converter cell 11 according to embodiment 1, different from FIG. 2.

Figure 4:
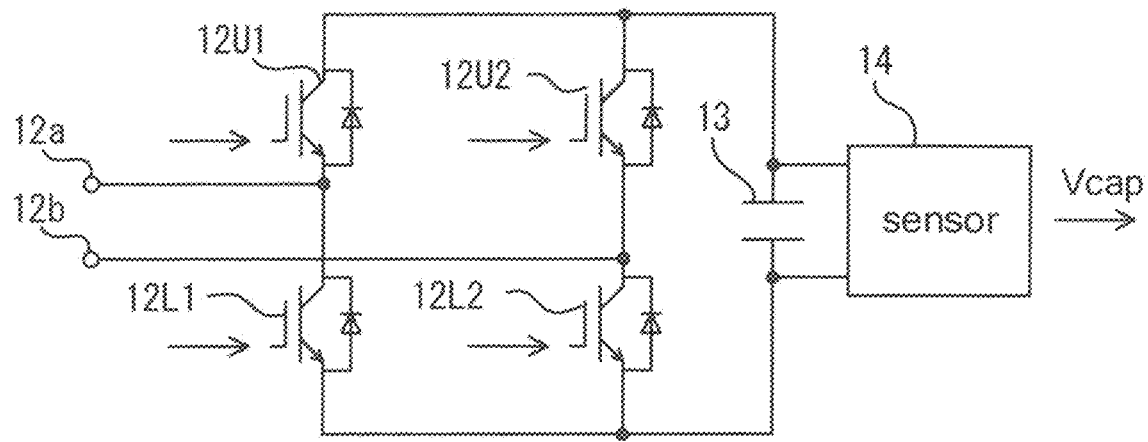
FIG. 4 is a circuit diagram showing an example of a configuration of a converter cell according to embodiment 1.

FIG. 4 is a circuit diagram showing another configuration example of the convert cell 11 according to embodiment 1, different from FIG. 2 and FIG. 3.

For the converter cell 11, any of the circuit configurations shown in FIG. 2 to FIG. 4 may be used, and the circuit configurations may be used in combination in the positive-side arm 10$u$P and the negative-side arm 10$u$N.

The convex cell 11 shown in FIG. 2 includes a series unit of semiconductor switching elements 12U, 12L connected in series to each other, a DC capacitor 13 as an energy storage element connected in parallel to the series unit, and a voltage sensor 14 for detecting a voltage value Vcap of the DC capacitor 13. A connection point between the semiconductor switch elements 12U and 12L is connected to an input/ output terminal 12a on the positive side, and a connection point between the semiconductor switching element 12L and the DC capacitor 13 is connected to an input/output terminal 12b on the negative side.

In the converter cell 11 having the configuration shown in FIG. 2, the semiconductor switching elements 12U, 12L are controlled so that one of them is turned on and the other is turned off. When the semiconductor switching element 12U is on and the semiconductor switching element 12L is off, voltage across the DC capacitor 13 is applied between the input/output terminals 12a and 12b. Positive-side voltage is applied on the input/output terminal 12a side and negative-side voltage is applied on the 12b side.

The converter cell 11 shown in FIG. 3 includes a series unit of semiconductor switching elements 12U, 12L connected in series to each other, a DC capacitor 13 as an energy storage element connected in parallel to the series unit, and a voltage sensor 14 for detecting a voltage value Vcap of the DC capacitor 13. A connection point between the semiconductor switching elements 12U and 12L is connected to an input/output terminal 12b on the negative side, and a connection point between the semiconductor switching element 12L and the DC capacitor 13 is connected to an input/output terminal 12a on the positive side.

In the converter cell 11 having the configuration shown in FIG. 3, the semiconductor switching elements 12U, 12L are controlled so that one of them is turned on and the other is turned off. When the semiconductor switching element 12U is off and the semiconductor switching element 12L is on, voltage across the DC capacitor 13 is applied between the input/output terminals 12a and 12b. Positive-side voltage is applied on the input/output terminal 12a side and negative-side voltage is applied on the 12b side.

The converter cell 11 having the configuration shown in FIG. 4 includes a series unit of semiconductor switching elements 12U1, 12L1 connected in series to each other, a series unit of semiconductor switching elements 12U2, 12L2 which are also connected in series to each other, a DC capacitor 13 as an energy storage element, and a voltage sensor 14 for detecting voltage value Vcap of the DC capacitor 13. The series unit of the semiconductor switching elements 12U1, 12L1, the series unit the semiconductor switching elements 12U2, 12L2, and the DC capacitor 13 are connected in parallel.

In the converter cell 11 having the configuration shown in FIG. 4, the semiconductor switching elements 12U1, 12L1 are controlled so that one of them is turned on and the other is turned off. Similarly, the semiconductor switching elements 12U2, 12L2 are controlled so that one of them is turned on and the other is turned off. When the semiconductor switching element 12U1 is on and the semiconductor switching element 12L1 is off, and when the semiconductor switching element 12U2 is off and the semiconductor switching element 12L2 is on, voltage across the DC capacitor 13 is applied between the input/output terminals 12a and 12b. Positive-side voltage is applied on the input/output terminal 12a side, and negative-side voltage is applied on the 12b side.

Further, the power conversion device 100 includes, in addition to each voltage sensor 14 for detecting the DC capacitor voltage value Vcap, a plurality of detectors for detecting voltages and currents of the power converter 1.

As shown in FIG. 1, the control device 50 receives phase voltages Vacu, Vacv, Vacw at the AC end of the power converter 1, currents Iacu, Iacv, Iac at the AC end, DC voltage Vdc between the positive-side DC terminal 6P and the negative-side DC terminal 6N, DC current Idc flowing through the positive-side DC terminal 6P or the negative-side DC terminal 6N, currents IuP, IvP, IwP flowing through the positive-side arms 10uP, vP, wP, currents IuN, IvN, IwN flowing through the negative-side arms 10uN, 10vN, 10wN, and the voltage value Vcap each DC capacitor 13, which are detected by the above detectors.

Hereinafter, the configuration of the control device 50 will be described.

Figure 5:
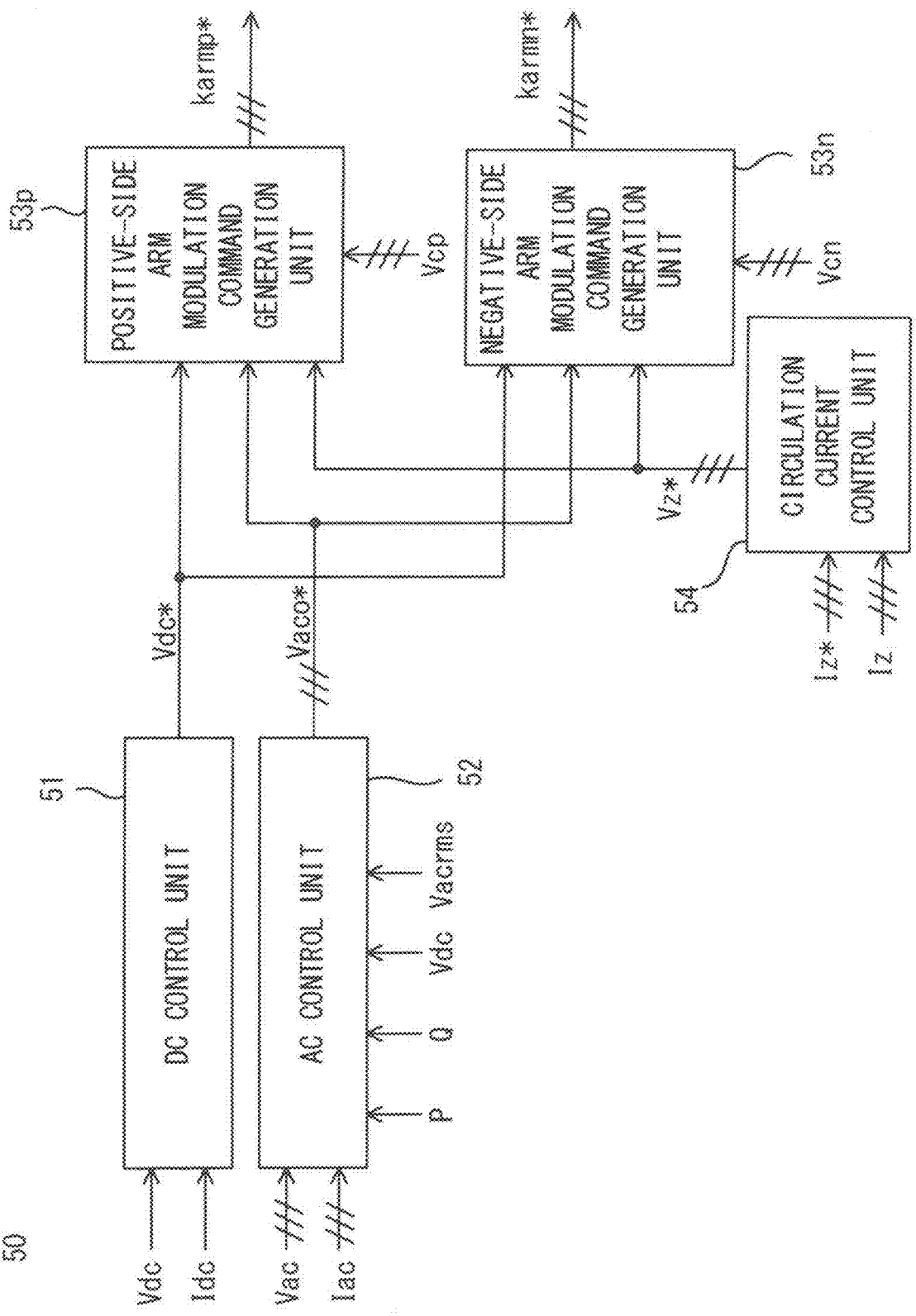
FIG. 5 shows a configuration of a preceding-stage part of a control device according to embodiment 1.

FIG. 5 shows a configuration of a preceding-stage part of the control device 50 according to embodiment 1.

Figure 6:
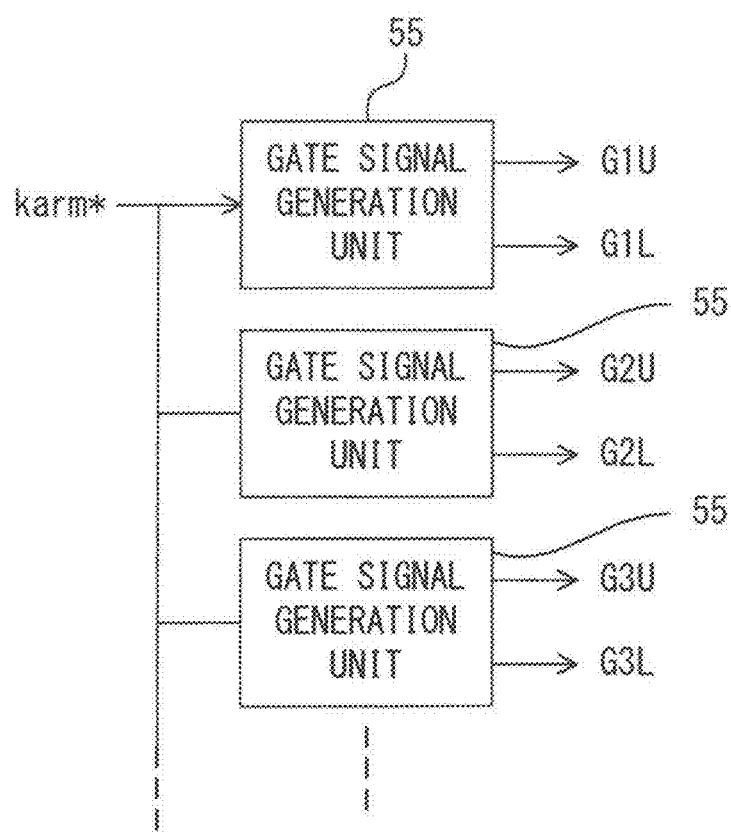
FIG. 6 shows a configuration of a subsequent-stage part of the control device according to embodiment 1.

FIG. 6 shows a configuration of a subsequent-stage part of the control device 50 according to embodiment 1.

Figure 7:
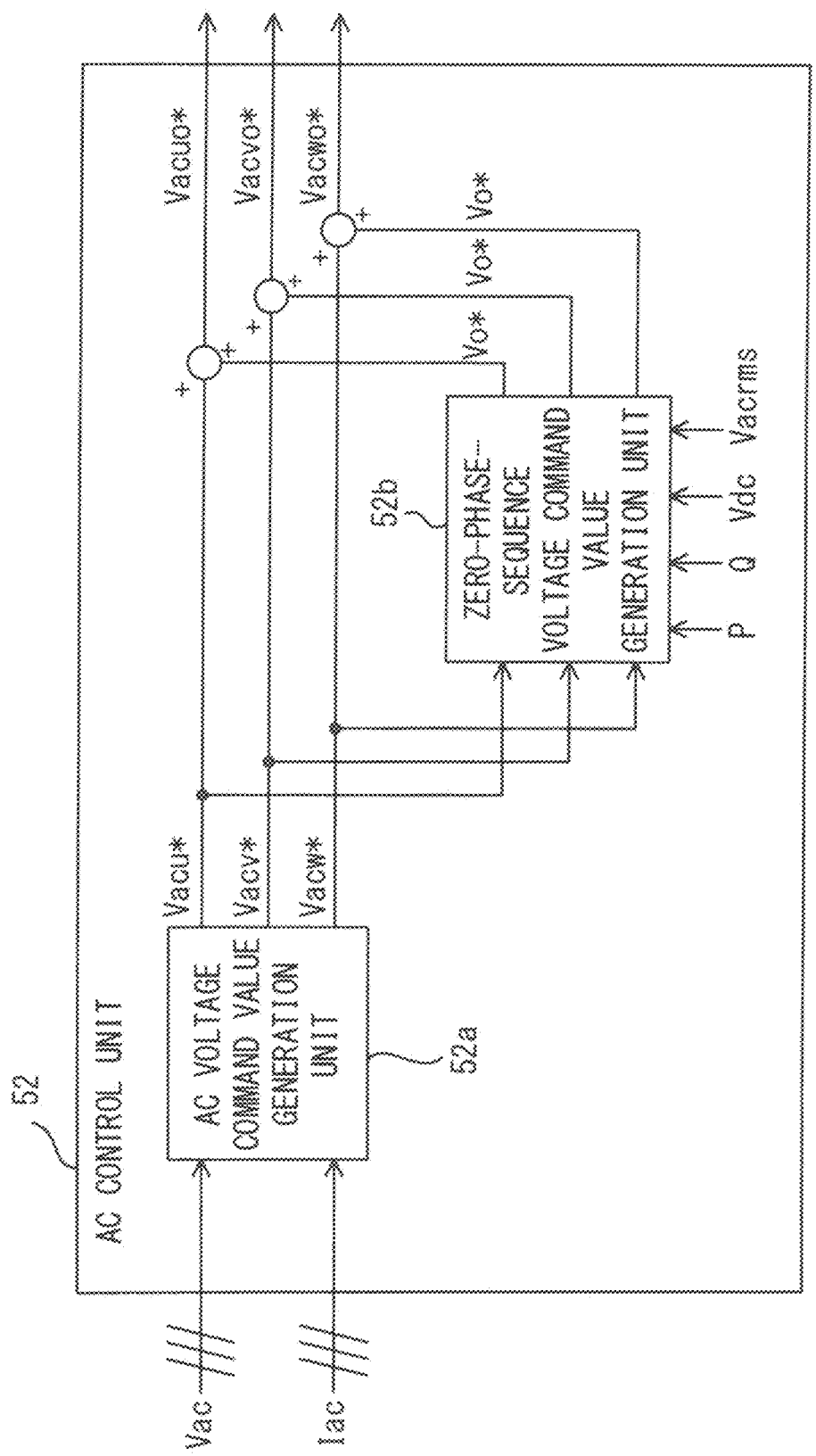
FIG. 7 shows configuration of an AC control unit according to embodiment 1

FIG. 7 shows a configuration of an AC control unit 52 in the control device 50 shown in FIG. 5.

Figure 8:
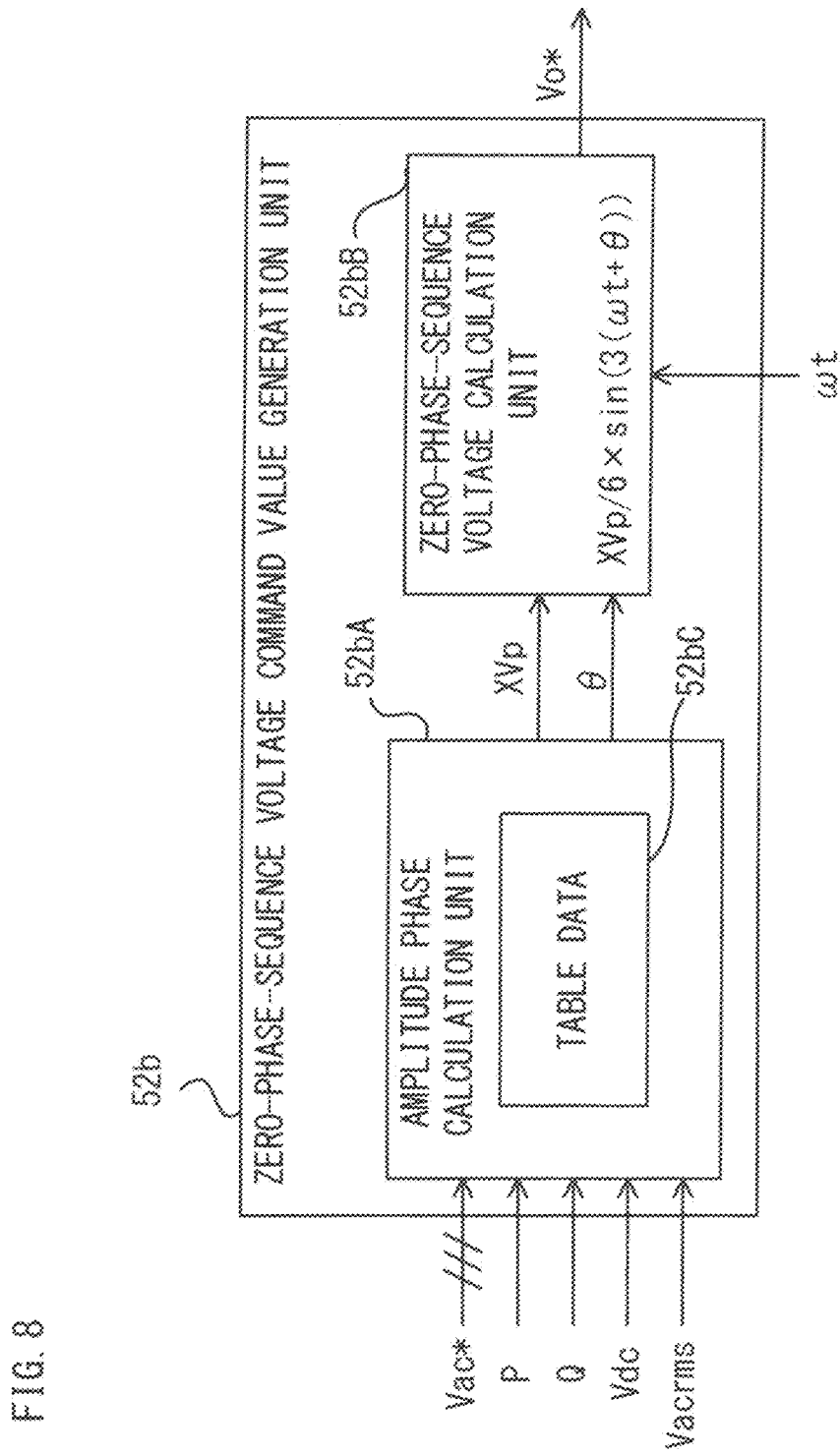
FIG. 8 shows a configuration of a zero-phase-sequence voltage command value generation unit according to embodiment 1.

FIG. 8 shows a configuration of a zero-phase-sequence voltage command value generation unit 52b in the AC control unit 52 shown in FIG. 7.

The control device 50 may be formed by a dedicated circuit, or a part or the entirety thereof may be formed by at least either a field programmable gate array (FPGA) or a microprocessor.

Hereinafter, with reference to FIG. 5 to FIG. 3, the configuration of the control device 50 and the outline of operation of each component will be described.

The control device 50 generates gate signals G for driving the semiconductor switching elements 12U, 12L in the converter cells 11 of the power converter 1 on the basis of detection values detected by the detectors.

As shown in FIG. 5, the control device 50 includes, in its preceding-stage part, a DC control unit 51, the AC control unit 52, a positive-side arm modulation command generation unit 53p, a negative-side arm modulation command generation unit 53n, and a circulation current control unit 54.

The DC control unit 51 receives the DC voltage Vdc between the positive-side DC terminal 6P and the negative-side DC terminal 6N of the power converter 1, and the DC current Idc flowing through the positive-side DC terminal 6P or the negative-side DC terminal 6N. The DC control unit 51 generates a DC voltage command value Vdc* on the basis of the received DC voltage Vdc and OC current Idc. The generated DC voltage command value Vdc* is inputted to the positive-side arm modulation command generation unit 53p and the negative-side arm modulation command generation unit 53n.

Here, the DC voltage command value Vdc* represents a DC voltage component that all the converter cells 11 included in the positive-side arms 10P and all the converter cells 11 included in the negative-side arms 10N should output.

The AC control unit 52 includes, as shown in its internal configuration in FIG. 7, an AC voltage command value generation unit 52a and the zero-phase-sequence voltage command value generation unit 52b.

The AC control unit 52 receives the phase voltages Vacu, Vacv, Vacw (which may be collectively referred to as AC voltages Vac) at the AC end of the power converter 1, and the currents Iacu, Iacv, Iacw (which may be collectively referred to as AC currents Iac) at the AC end.

On the basis of the received AC voltages Vac and AC currents Iac, the AC control unit. 52 generates AC voltage command values Vacu*, Vacv*, Vacw* (which may be collectively referred to as AC voltage command values Vac*) for controlling AC voltages for u phase, v phase, w phase, respectively, by the AC voltage command value generation unit 52a.

Then, the AC control unit 52 adds, to the generated AC voltage command values Vac*, zero-phase-sequence volt command values Vo* which are the same common value outputted from the zero-phase-sequence voltage command value generation unit 52b, thereby correcting the AC voltage command values Vac*, thus generating corrected AC voltage command values Vacuo*, Vacvo*, Vacwo* (which may be collectively referred to as corrected AC voltage command values Vaco*).

The corrected AC voltage command values Vaco* represent AC voltage components that all the converter cells 11 included in the positive-side arms 10uP and all the converter cells 11 included in the negative-side arms 10uN should output. The de ails of the zero-phase-sequence voltage command value Vo* will be described later.

As shown in FIG. 5, the generated corrected AO voltage command values Vaco* (Vacuo*, Vacvo*, Vacwo*) are outputted from the AC control unit 52 and inputted to the positive-side arm modulation command generation unit 53p and the negative-side arm modulation command generation unit 53n.

The circulation current control unit 54 shown in FIG. 5 outputs a circulation volt e command value Vz* for performing control so that circulation Iz follows a circulation current command value Iz* for balancing, among the arms 10, voltages of the DC capacitors 13 included in the arms 10. The outputted circulation voltage command value Vz* is inputted to the positive-side arm modulation command generation unit 53p and the negative-side arm modulation command generation unit 53n.

Here, the circulation current Iz re resents current flowing among the respective phase legs 9u, 9v, 9w without flowing to the AC end and the DC end, in the power converter 1.

The positive-side arm modulation command generation unit 53p shown in FIG. 5 adds the DC voltage command value Vdc* and the circulation voltage command value Vz* and subtracts the corrected AC voltage command value Vaco*, thereby generating a positive-side arm output voltage command value Varmp* (not shown) for commanding on the output voltages of the positive-side arms 10uP, 10vP, 10wP for the respective phases. The positive-side arm modulation command generation unit 53p divides the positive-side arm output voltage command value Varmp* by a value Vcp corresponding to the sum of the voltage values of the DC capacitors 13 included in t ponding positive-side arm 10uP, 10vP, 10wP, thereby generating a positive-side modulation command karmp*.

Similarly, the negative-side arm voltage command value generation unit 53n adds the DC voltage command value Vdc* and the circulation voltage command value Vz* and adds the corrected AC voltage command value Vaco*, thereby generating a negative-aide arm output voltage command value Varmn* for commanding on the output voltages of the negative-side arms 10uN, 10vN, 10wN for the respective phases. The negative-side arm voltage command value generation unit 53n divides the negative-side arm output voltage command value Varmn* by a value Vcn corresponding to the sum of the voltage values of the DC capacitors 13 included in the corresponding negative-side arm 10uN, 10vN, 10wN, thereby generating a negative-side modulation command karmn*.

When the positive-side arm output voltage command value Varmp* and the negative-side arm output volt age command value Varmn* need not be discriminated from each other, they are referred to as arm voltage commands Varm*.

When the positive-side modulation command karmp* and the negative-side modulation command karma* need not be discriminated from each other, they are referred to as modulation commands karm*.

The generated modulation commands karm* are sent to the subsequent-stage part of the control device 50 shown in FIG. 6.

As shown in FIG. 6, the control device 50 includes, in its subsequent-stage part, a plurality of gate signal generation units 55 for generating gate signals G (G1U, G1L, G2U, G2L, G3U, G3L, . . . ) for driving the semiconductor switching elements 12U, 12L included in all the converter cells 11 that the responding arm 10 has.

Although it is described that the gate signal generation units 55 are included in the control device 50, the gate signal generation units 55 may be included in the respective converter cells 11.

In the gate signal generation units 55, for example, a PWM method in which the gate signals G are obtained through magnitude comparison between the inputted modulation command karm* and a carrier is used. In the case where a plurality of converter cells 11 are connected as in a multilevel converter, a phase shift PWM method in which, in the arm 10, the phases of respective carrier waves are shifted by a value obtained by dividing 360 degrees by the number of the converter cells 11 included in the arm 10, is used.

Here, the "value corresponding to the sum of the voltage values of the DC capacitors 13 included in the arm 10" may be obtained by summing all the voltage values Vcap of the DC capacitors 13 obtained from the voltage sensors 14 provided to the converter cells 11 included in one arm 10. Alternatively, in the case of using phase shift PWM in generating gate signals for the gate signal generation unit 55 in FIG. 6, the above value may be obtained by summing some of the voltage values Vcap of the DC capacitors 13 of the converter cells 11 and multiplying the sum by [(the number of the converter cells 11 in the arm 10)+(the number of converter cells used for detection of the voltage values Vcap of the DC capacitor 13 in the arm 10)].

With the gate signals G generated as described above, the converter cells 11 in the arms 10 of the power converter 1 are subjected to output control.

Hereinafter, the details of the zero-phase-sequence voltage command value Vo* generated in the phase-sequence voltage command value generation unit 52b in the AC control unit 52 will be described.

Where the AC voltage command values Vac* have a sinewave with a fundamental angular frequency ω in a three-phase balanced state, the zero-phase-sequence voltage command value Vo* has a sinewave with frequency obtained by multiplying the fundamental angular frequency ω of the AC voltage command values Vac* by an odd-number multiple of the number of phases of the AC power supply 2 (3× (2N−1), N is an integer not less than 1).

Further, for the zero-phase-sequence voltage command value Vo*, the initial value of the amplitude thereof is controlled to ⅙ of an amplitude Vp of the AC voltage command values Vac*, and the initial value of the phase thereof is controlled so as to be set at a phase 0 of each AC voltage command value Vac*.

That is, the u phase AC voltage command value Vacu* is defined as follows, $$Vacu^* = Vp \times \sin(\omega t) \quad \text{(Expression 1)}$$

Then, where the frequency of the zero-phase-sequence voltage command value Vo* is three times the fundamental angular frequency ω of the AC voltage command value Vac*, the zero-phase-sequence voltage command value Vo* is represented as follows.

$$Vo^* = Vp/6 \times \sin(3\omega t) \quad \text{(Expression 2)}$$

Here, in the power conversion device 100 of the present embodiment, the zero-phase-sequence voltage command valve generation unit 52b performs adjustment control for adjusting at least either the initial value of the amplitude or the initial value of the phase of the zero-phase-sequence voltage command value Vo*, as shown in the following (Expression 3).

$$Vo^* = XVp/6 \times \sin(3 \times (\omega t + \theta)) \quad \text{(Expression 3)}$$

Here, X is an amplitude adjustment coefficient and θ is an adjustment angle.

Hereinafter, adjustment control by the zero-phase-sequence voltage command value generation unit 52b will be described.

As shown in FIG. 8, the zero-phase-sequence voltage command value generation unit 52b includes an amplitude phase calculation unit 52bA having table data 52bC stored therein and a zero-phase-sequence voltage calculation unit 52bB.

In the table data 52bC, optimum values of the amplitude adjustment coefficient X and the phase adjustment angle θ for the zero-phase-sequence voltage command value Vo* corresponding to the AC voltage command value Vac*, active power P of the power converter 1, reactive power Q thereof, the DC voltage Vdc, and an effective value Vacrms of the line-to-line voltage of the AC terminals, are recorded in advance.

The zero-phase-sequence voltage command value generation unit 52b rea optimum values of the amplitude adjustment coefficient X and the adjustment angle θ corresponding to the inputted values of the AC voltage command value Vac*, the active power P of the power converter 1, the reactive power Q thereof, the DC voltage Vdc, and the effective value Vacrms of the line-to-line voltage of the AC terminals, and outputs the read values to the zero-phase-sequence voltage Calculation unit 52bB.

The zero-phase-sequence voltage calculation unit 52bB performs adjustment control for adjusting at least either the initial value of the amplitude and the initial value of the phase of the zero-phase-sequence voltage command value Vo* as shown by the above (Expression 3), using the inputted values of the amplitude adjustment coefficient X and the adjustment angle θ.

Hereinafter, the details of the table data 52bC used in the adjustment control will be described, using power conversion devices in reference examples.

First, a case of using a power conversion device in a reference example in which a voltage value sum corresponding value Vc representing the sum of the voltage values Vcap of the DC capacitors 13 is constant, will be discussed.

The voltage valve sum corresponding value Vc used in the following description is a value that collectively refers to the values Vcp and Vcn each corresponding to the sum of the voltage values Vcap of the DC capacitors 13 in the positive-side arm 10P or the negative-side arm 10N fox each phase.

Figure 9:
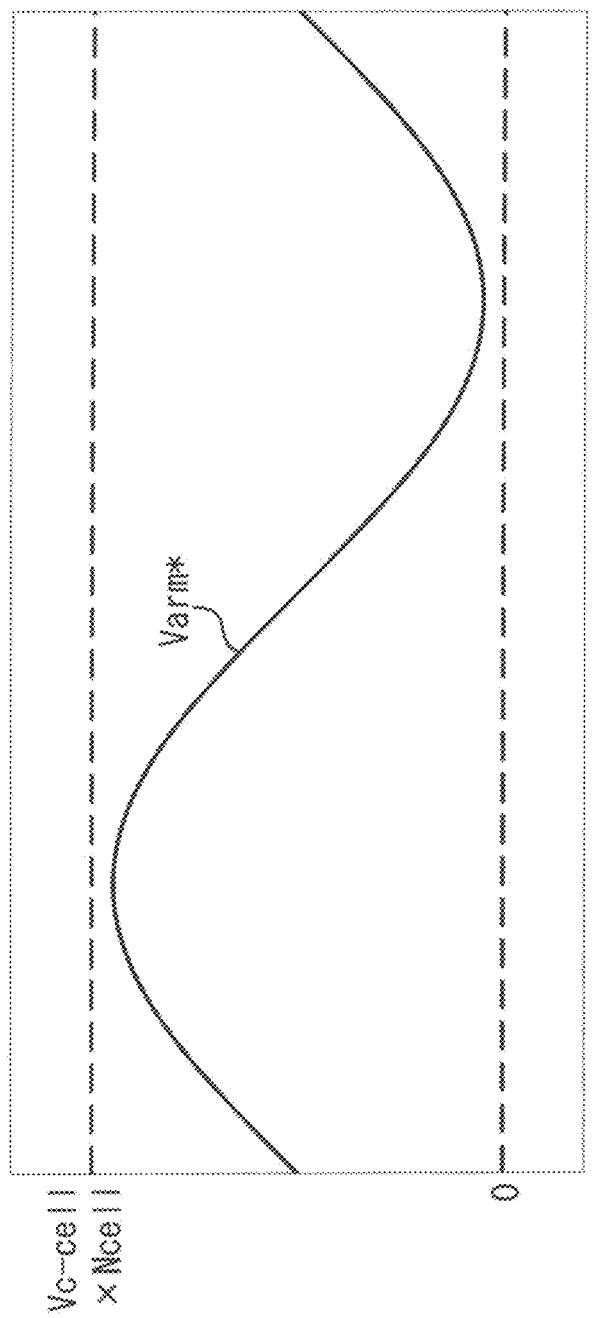
FIG. 9 shows an operation waveform in a power conversion device in reference example 1.

FIG. 9 shows of the arm voltage command Varm* in the power conversion device in reference example 1 in which an AC modulation factor kac of the AC voltage command value Vac* is small and the AC voltage command value Vac* is not corrected by the zero-phase-sequence voltage command value Vo*.

In FIG. 9, "Ncell" of "Vc-cell×Ncell" denotes number Np of the converter cells 11 in the positive-side arm 10P or a number Nn of the converter cells 11 in the negative-side arm 10N.

In FIG. 9, "Vc-cell" of "Vc-cell×Ncell" denotes a value obtained by dividing the value Vcp (voltage value sum corresponding value Vc) corresponding to the sum of the voltage values Vcap of the DC capacitors 13 in the positive-side arm 10P by the number Np of the converter cells 11 in the positive-side arm. Alternatively, "Vc-cell" denotes a value obtained by dividing the value Vcn (voltage value sum corresponding value Vo) corresponding to the sum of the voltage values Vcap of the De capacitors 13 in the negative-side arm 10N by the number Nn of the converter cells 11 in the negative-side arm.

That is, in FIG. 9, "Vc-cell×Ncell" denotes an upper limit value of the limit value of the arm modulation command for controlling the converter cells 11, derived on the basis of the sum of the voltage values Vcap of the DC capacitors 13 in each arm 10, and 0 denotes a lower limit value thereof.

Here, the AC modulation factor kac is represented by the following (Expression 4).

$$kac = Vp + (2 * Vc) \quad \text{(Expression 4)}$$

Under the condition that the voltage value sum corresponding value Vc representing the sum of the voltage values Vcap of the DC capacitor 13 is constant, i.e., "Vc-cell×Ncell" (hereinafter, referred to as capacitor voltage Vc-cell×Ncell) is constant as shown in FIG. 9, if the AC modulation factor kac is small, the arm voltage command Varm* does not become greater than the capacitor voltage Vc-cell×Ncell and also does not become smaller than 0. Therefore, in the power conversion device in reference example 1, the corresponding arm can output voltage as indicated by the set arm voltage command Varm*.

Figure 10:
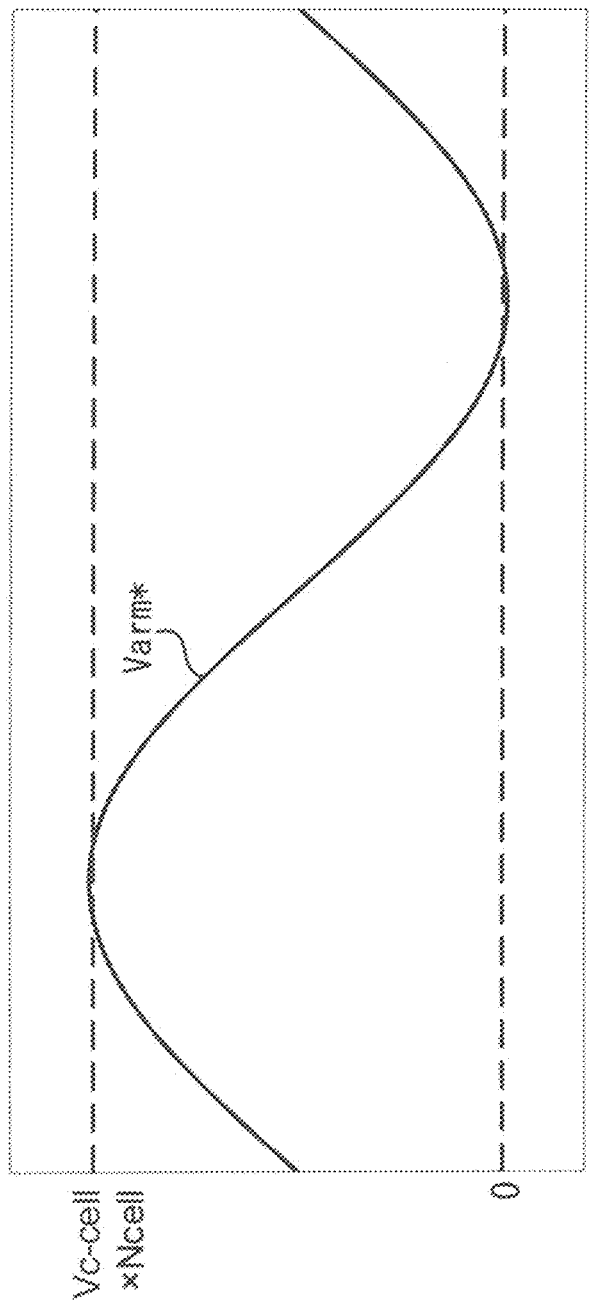
FIG. 10 shows an operation waveform in a power conversion device in reference example 2.

FIG. 10 shows waveform of the arm voltage command Varm* in the power conversion device in reference example 2 in which the AC modulation factor kac of the AC voltage command value Vac* is small and the AC voltage command value Vac* is not corrected by the zero-phase-sequence voltage command value Vo*.

As shown in FIG. 10, even under the condition that the capacitor voltage Vc-cell×Ncell is constant, if the AC modulation factor kac is great, there is a part where the arm voltage command Varm* becomes greater than the capacitor voltage Vc-cell×Ncell and there is also a part where the arm voltage command Varm* becomes smaller than 0. Therefore, in the power conversion device in reference example 2, the arm voltage command Varm* becomes greater or smaller than the voltage that the corresponding arm can output. Thus, in actuality, the power conversion device in reference example 2 cannot output a value as indicated by the arm voltage command Varm*. This adversely affects controls of the power converter.

Figure 11:
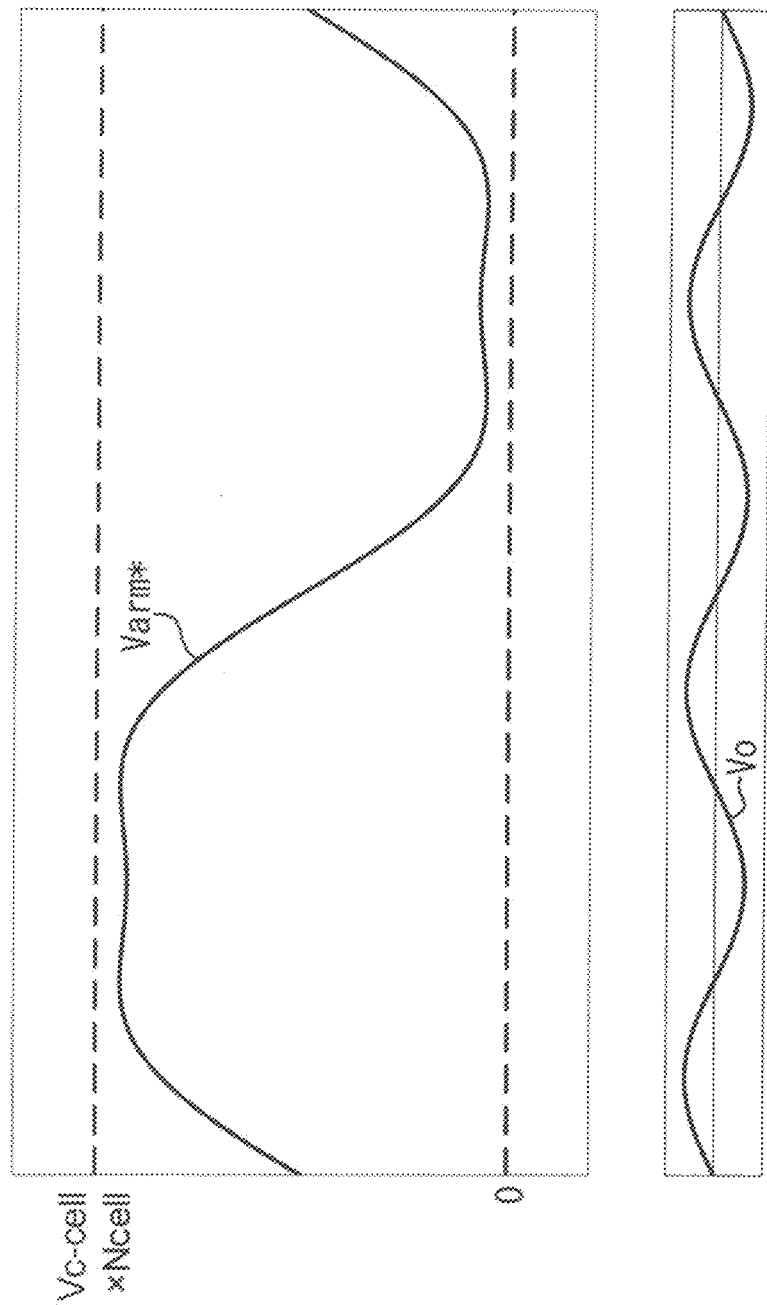
FIG. 11 shows operation waveforms in a power conversion device in reference example 3.

FIG. 11 shows a waveform of arm voltage command Varm* in a power conversion device in reference example 3 which uses the AC voltage command value Vac* having the same AC modulation factor kac as in the power conversion device in reference example 2 shown in FIG. 10. Further, in reference example 3, the AC voltage command value Vac* is corrected by the zero-phase-sequence voltage command value shown Vo* by the above (Expression 2).

As shown in FIG. 11, in the power conversion device in reference example 3, under the condition that the capacitor voltage Vc-cell×Ncell is constant, the arm voltage command Varm* does no greater than the capacitor voltage Vc-cell×Ncell and does not become than 0. The voltage command value Varm* for each arm is distorted at a frequency that is three times a fundamental frequency f, but since the same common zero-phase-sequence voltage command value Vo* is given to all the three phases, the voltages outputted between the lines are equal and there is no influence on the AC end. Thus, by giving the zero-phase-sequence voltage command value Vo* having a sinewave with a frequency that is three times (3×(2N−1) times) the fundamental frequency f of the AC voltage command value Vac* as shown in (Expression 2), the corresponding arm can output a value as indicated by the arm voltage command Varm* without causing an influence on the grid side. That is, the required voltage value sum corresponding value Vc can be reduced and the DC capacitors can be downsized.

However, in a multilevel converter in which a plurality of converter cells each including a DC capacitor are connected in series in a multiplexed manner, in each arm, power pulsation occurs in one fundamental cycle. When power pulsation occurs, pulsation occurs in voltages of the DC capacitors included in the arm. In a case of attempting to downsize the DC capacitors, one of problems is to reduce the capacitance, but if the capacitance is reduced, voltage pulsation of the DC capacitors due to power pulsation increases. As a result, the capacitor voltage Vc-cell×Ncell no longer becomes constant, and thus causes pulsation.

Figure 12:
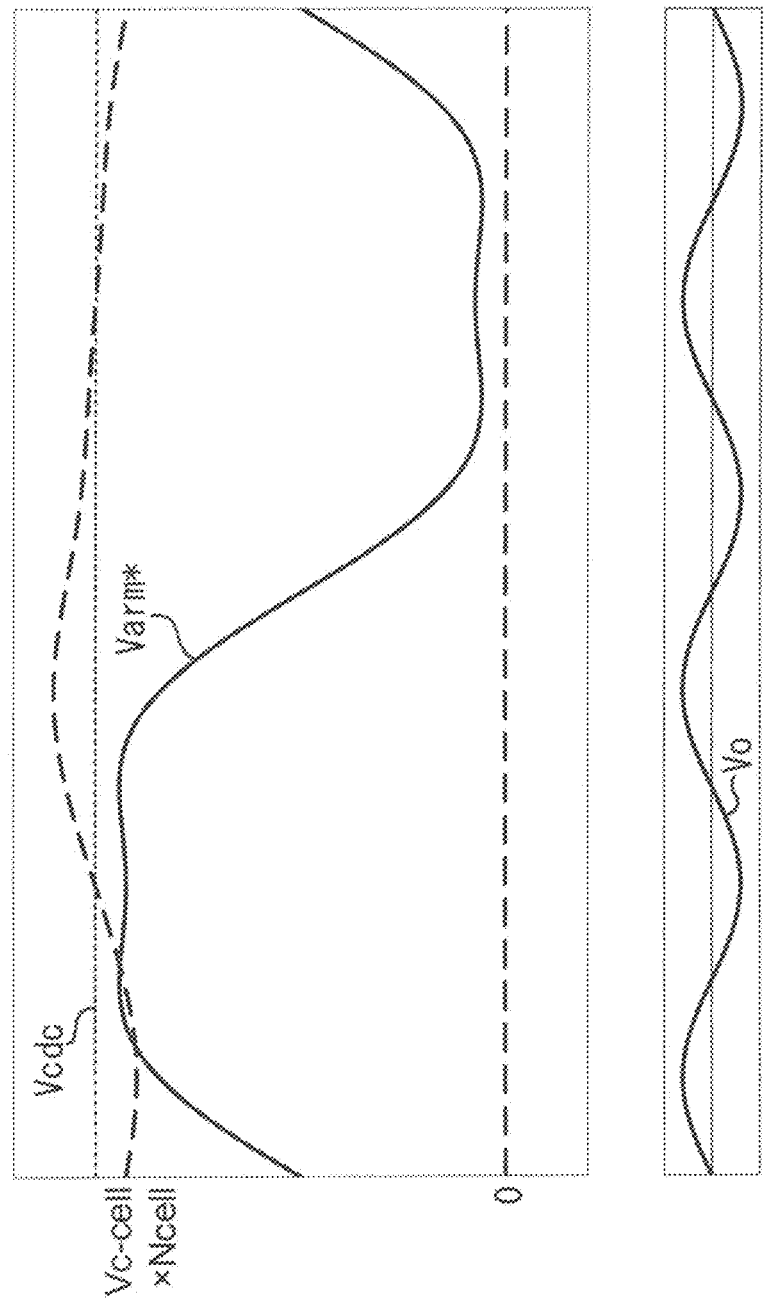
FIG. 12 shows operation waveforms in a power conversion device in reference sample 4.

FIG. 12 shows a waveform of the arm voltage command Varm* in a power conversion device in reference example 4 in a case of using the AC voltage command value Vac* and the zero-phase-sequence voltage command value Vo* that are the same as those in the power conversion device in reference example 3 shown in FIG. 11, under the condition that voltage pulsation occurs in the capacitor voltage Vc-cell×Ncell.

In FIG. 12, Vcdc denotes the capacitor voltage Vc-cell×Ncell when voltage pulsation is eliminated, and represents the time average of the capacitor voltage Vc-cell×Ncell.

In FIG. 12, there is a part where the arm voltage command Varm* becomes greater than the pulsating capacitor voltage Vc-cell×Ncell. Therefore, in actuality, the power conversion device in reference example 4 cannot output a value as indicated by the arm voltage command Varm*. This adversely affects controls of the power converter.

First, voltage Varm that the arm 10 outputs as a whole will be discussed. Here, u phase is used as a reference.

Arm output voltage Varmpu for u phase on the positive side is equivalent to an arm voltage command value Varmpu* for u phase on the positive side. Here, when voltage Vz for controlling the circulation current Iz is not considered, the u phase positive-side arm output voltage Varmpu is represented by the following (Expression 5).

$$Varmpu = -Vaco + Vdc/2 + Vo \quad \text{(Expression 5)}$$

Here, Vo is zero-phase-sequence voltage.

In addition, current Iarmpu flowing through the u phase positive-side arm 10uP is represented by the following (Expression 6).

$$Iarmpu = -Iacu/2 + Idc/3 \quad \text{(Expression 6)}$$

Here, Vacu and Iacu are represented as follows:

$$Vacu = \sqrt{(2/3)} \times Vacrms \times \sin(\omega t), \text{ and}$$

$$Iacu = \sqrt{2} \times Iacrm \times \sin(\omega t + \varphi),$$

where Vacrms is the effective value of the line-to-line voltage of the AC-side terminals, and φ is φ when the power factor is cos φ (i.e., φ is a phase angle of current with respect to voltage), In this case, instantaneous power parmpu transferred through the arm 10uP for u phase on the positive side, i.e., flowing in/out to/from the arm 10 for u phase on the positive side, is represented by the following expression (7).

$$parmpu = Varmpu \times Iarmpu = Vacu \times Iacu/2 - Vacu \times Idc/3 - Vdc \times Iacu/2 + Vdc \times Idc/6 + Vo \times (-Iacu/2 + Idc/3) = 2/\sqrt{3} \times Vacrms \times Iacrms \times \sin(\omega t+\varphi)*\sin(\omega t) - 1/3 \times \sqrt{(2/3)} \times Vacrms \times Idc \times \sin(\omega t) - 1/\sqrt{2} \times Vdc \times Iacrms \times \sin(\omega t+\varphi) + Vdc \times Idc/6 \quad \text{(Expression 7)}$$

Here, the influence on the instantaneous power due to the zero-phase-sequence voltage Vo is small and therefore is neglected.

By integrating the above (Expression 7), an electric energy variation value ΔWarmpu of the arm for u phase on the positive side can be derived.

Here, when voltage pulsation of the DC capacitors 13 in each arm 10 has the maximum value is when electric energy transferred through the arm 10 is maximized, and when the pulsation has the minimum value is when electric energy transferred through the arm 10 is minimized.

Figure 13:
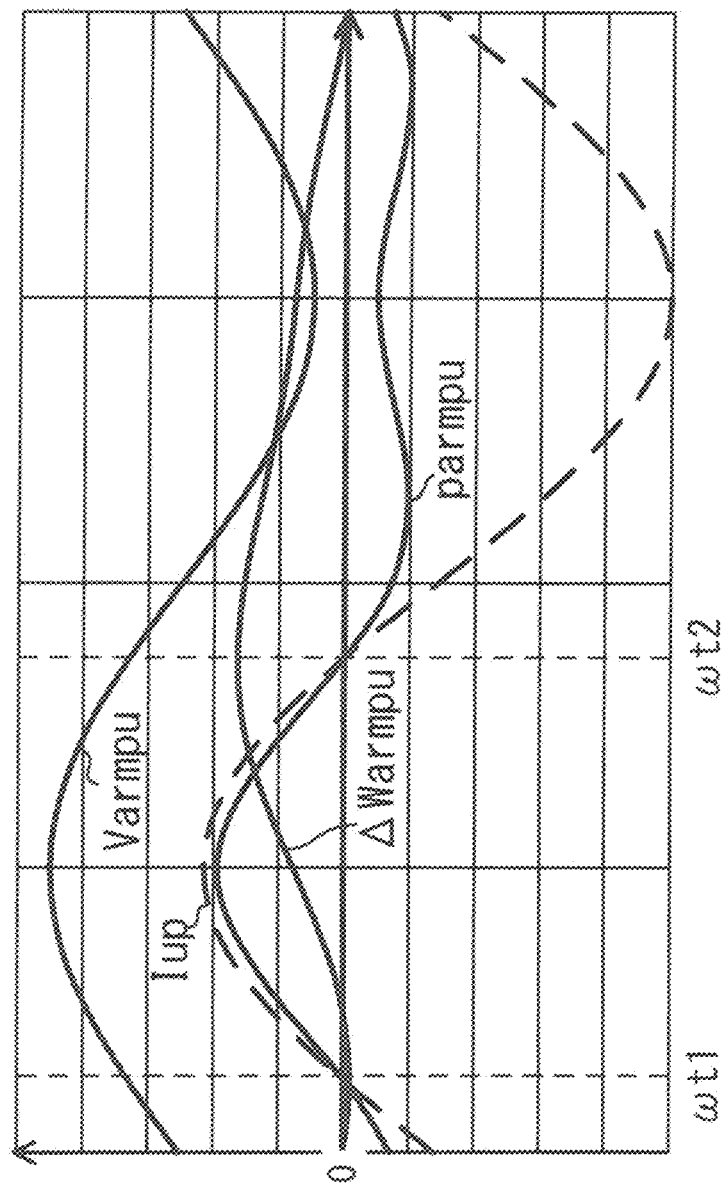
FIG. 13 shows operation waveforms in the power conversion device according embodiment 1.

FIG. 13 shows current Iup flowing through the u phase positive-side arm 10uP, the u phase positive-side arm output voltage Varmpu, the instantaneous power parmpu of the u phase positive-side arm 10uP, and the electric energy variation value ΔWarmpu of the u phase positive-side arm 10uP in the power conversion device 100 of the present embodiment.

As shown in FIG. 13, a phase ωt1 at which the electric energy variation value ΔWarmpu of the u phase positive-side 10uP has the minimum value is a zero cross phase at which the instantaneous power parmpu changes from negative to positive.

A phase ωt2 at which the electric energy variation value ΔWarmpu has the maximum value is a zero cross phase at which the instantaneous power parmpu changes from positive to negative.

Therefore, the phases at which the electric energy variation value ΔWarmpu of the arm for u phase on the positive side has the maximum value and the minimum value can be derived by deriving solutions when parmpu becomes 0. That is, regarding a relational expression f(φ, Vac, Iac, Idc, Vdc) representing the instantaneous power parmpu of the arm 10, which includes the phase angle φ of the instantaneous current with respect to the instantaneous voltage, the AC voltage Vac, the AC current Iac, the De current Idc, and the DC voltage Vdc as variables shown in the above Expression (7), solutions of the variables when the relational expression f(φ, Vac, Iac, Idc, Vdc)=0 is satisfied are to be derived. The solutions when the instantaneous power parmpu becomes 0 in one cycle differ depending on the values of variables such as the power factor cos φ, the active power P and the rea transferred through the power convert 1 determining the magnitude in the vector direction corresponding to the phase displacement thereof, the AC voltage Vac, the DC voltage Vdc, the AC current Iac, and the DC current Idc.

Therefore, the phases at which the electric energy variation value ΔWarmpu of the u phase positive-s arm 10uP has the maximum and minimum values in one fundamental cycle also differ depending on the values of variables such as the power factor cos φ, the active power P and the reactive power Q, the AC voltage Vac, the DC voltage Vdc, the AC current Iac, and the DC current Idc, and accordingly, the magnitude of the capacitor voltage Vc-cell×Ncell and the phases corresponding to the maximum and minimum values thereof also change.

For the table data 52bC that the zero-phase-sequence voltage command value generation unit 52b shown in FIG.

8 has, the magnitude of the amplitude of voltage pulsation of the capacitor voltage Vc-cell×Ncell and the phases at which the pulsation has the maximum and minimum values, corresponding to the values of the power factor cos φ, the active power P, the reactive power Q, the C voltage Vac (the effective value Vacrms of the line-to-line voltage of the AC terminals), the DC voltage Vdc, the AC current Iac, and the DC current Idc are derived through numerical analysis, simulation, experiment, or the like, and then is recorded in advance.

Further, the table data 52bC has recorded therein appropriate values of the amplitude adjustment coefficient X and the adjustment angle θ for the zero-phase-sequence voltage command value Vo* such that the arm voltage command Varm* (arm modulation command) does not interfere with pulsation of the capacitor voltage Vc-cell×Ncell derived as described above.

Thus, on the basis of the values of the power factor cos φ, the AC voltage Vac, the DC voltage Vdc, the AC current Iac, and the DC current Ide detected during operation of the power conversion device 100, the control device 50 reads the optimum value of at least either the amplitude adjustment coefficient X or the adjustment angle θ, from the table data 52bC, and performs adjustment control for adjusting at least either the amplitude or the phase of the zero-phase-sequence voltage command value Vo*.

Here, it will be shown that such optimum amplitude adjustment coefficient X and adjustment angle θ that the arm voltage nd Varm* (arm modulation command) does not interfere with the pulsating capacitor voltage Vc-cell×Ncell are such values that a value obtained by dividing the arm modulation command corrected using the amplitude adjustment coefficient X and the adjustment angle θ by the capacitor voltage Vcp, Vcn (corresponding to the limit value of the arm modulation command) corresponding to the sum of voltage values of the DC capacitors included in the corresponding arm is smaller than 1.

In addition, such optimum amplitude adjustment coefficient X and adjustment angle θ that the arm voltage command Varm* (arm modulation command) does not interfere with 0 which is the lower limit value of the limit value of the modulation command are such values that a value obtained by dividing the arm modulation command by the capacitor voltage Vcp, Vcn ponding to the limit value of the arm modulation command) is greater than 0.

Figure 14:
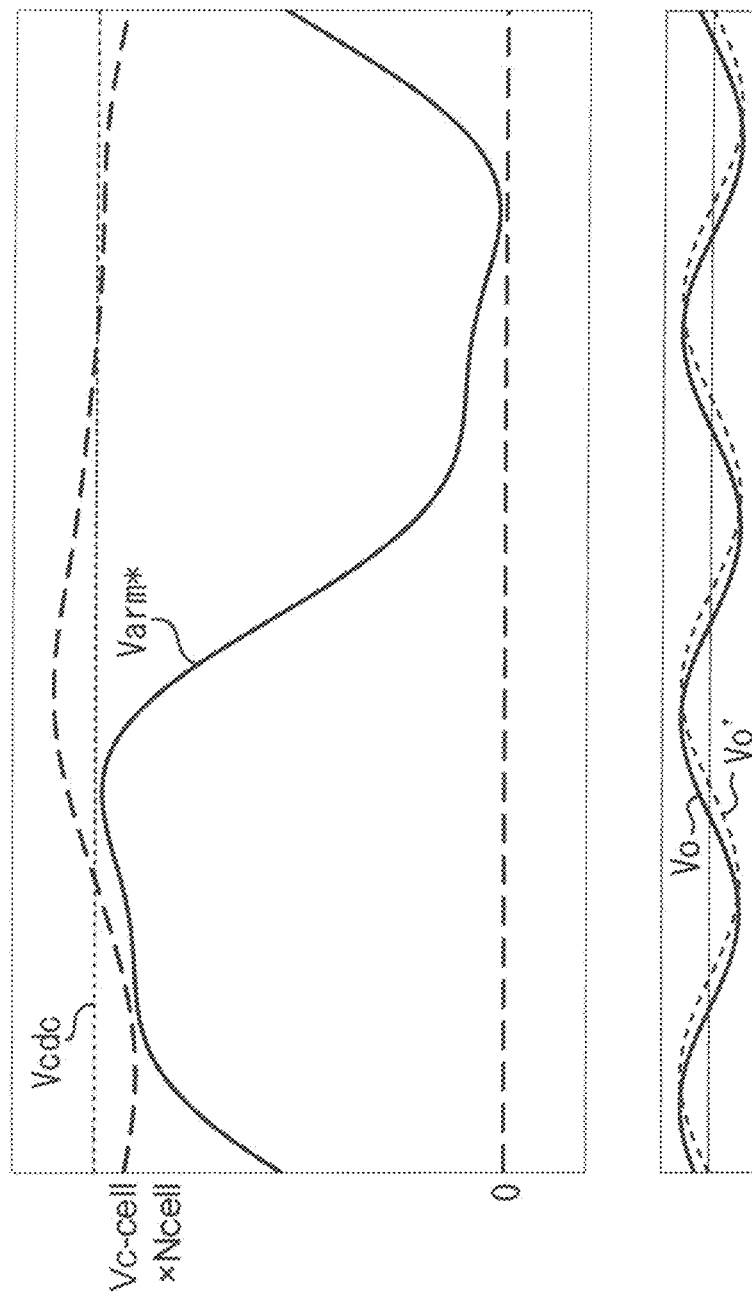
FIG. 14 shows operation waveforms in the power conversion device according to embodiment 1.

FIG. 14 shows a waveform of the arm voltage command Varm* in the power conversion device 100 of the present embodiment.

In FIG. 14, the capacitor voltage Vc-cell×Ncell has pulsation as in FIG. 11 and the same AC voltage command value Vac* as in FIG. 11 is used, and further, adjustment control is performed for advancing the phases of the zero-phase-sequence voltage command value Vo* by the adjustment angle θ so that a zero-phase-sequence voltage command valve Vo'* which is an initial value becomes the zero-phase-sequence voltage command value Vo*.

In the adjustment control, the phase of the maximum value of the arm voltage command Varm* is Shifted so that the maximum value of the arm voltage command Varm* does not interfere with the pulsating capacitor voltage Vc-cell×Ncell. Thus, the arm voltage command Varm* does not become greater than even the pulsating capacitor voltage Vc-cell×Ncell. As a result, also in the multilevel converter in which voltage pulsation occurs in the capacitor voltage Vc-cell×Ncell, the corresponding arm 10 can output a value as indicated by the arm voltage command Varm*.

Figure 15:
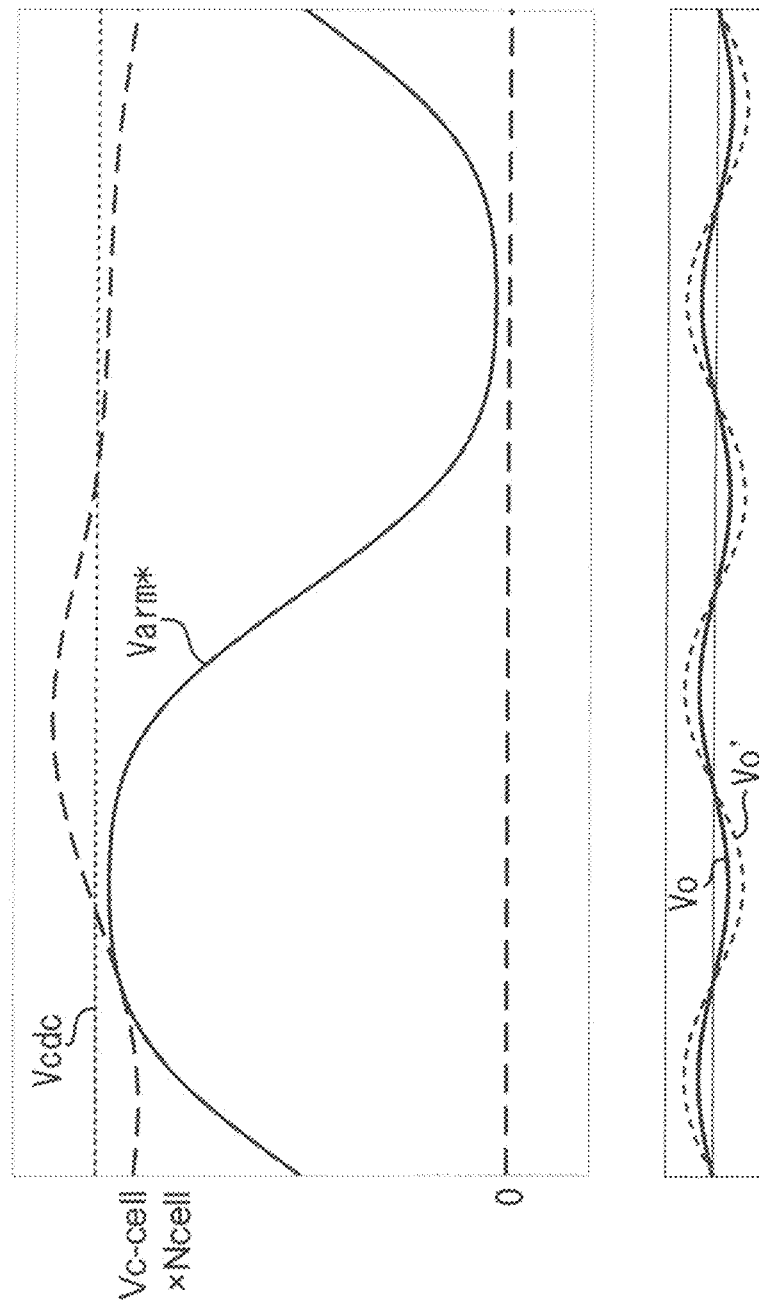
FIG. 15 shows operation waveforms in the power conversion device according to embodiment 1.

FIG. 15 shows a waveform of the arm voltage command Varm* in the power conversion device 100 of the present embodiment.

In FIG. 15, the capacitor voltage Vc-cell×Ncell has pulsation as in FIG. 11 and the same AC voltage command value Vac* as in FIG. 11 is used, and further, adjustment control for halving the amplitude of the zero-phase-sequence voltage command value Vo* is performed so that a zero-phase-sequence voltage command value Vo' which is an initial value becomes the zero-phase-sequence voltage Vo.

As shown in FIG. 15, also in the case where the amplitude of the zero-phase-sequence voltage command value Vo* is reduced, the phase of the maximum value of the arm voltage command Varm* is shifted so that the maximum value of the arm voltage command Varm* does not with the pulsating capacitor voltage Vc-cell×Ncell.

Thus, the arm voltage command k does not become greater than even the pulsating capacitor voltage Vc-cell×Ncell. As a result, also in the multilevel converter in which voltage pulsation occurs in the capacitor voltage Vc-cell×Ncell, the corresponding arm 10 can output a value as indicated by the arm voltage command Varm*.

As described above, in accordance with the values of the active power P and the reactive power Q, the AC voltage Vac, the DC voltage Vdc, the AC current Iac, and the DC current Idc, the amplitude or the phase of the zero-phase-sequence voltage command value Vo* is adjusted to an appropriate value, whereby voltage that each arm 10 can output can be increased as compared to the reference examples.

In the adjustment controls shown in FIG. 14 and FIG. 15, the examples in which only either phase adjustment or amplitude adjustment for the zero-phase-sequence voltage command value Vo* is performed have been shown. However, adjustment control is not limited thereto. In adjustment control, both of phase adjustment and amplitude adjustment for the zero-phase-sequence voltage command value Vo* may be performed in accordance with the characteristics of pulsation of the capacitor voltage Vc-cell×Ncell.

The table data 52bC that the zero-phase-sequence voltage command value generation unit 52b has may be configured as follows.

For example, a plurality of optimum valves of at least either the amplitude of the phase of the zero-phase-sequence voltage command value, derived on the basis of electric energy variation in the arm 10, are corded. Then, an approximate expression of change in the plurality of recorded values of the amplitude or the phase corresponding to the active power P, the reactive power Q, the AC voltage Vac, the DC voltage Vdc, the AC current Iac, and the DC current Idc is derived and recorded in the table data 52bC. Then, the control device 50 may perform adjustment control in accordance with the approximate expression.

The control device 50 may monitor the capacitor voltage Vc-cell×Ncell varying on the basis of electric energy variation in the arm 10 for one cycle of the AC power supply 2 and record the monitored capacitor voltage Vc-cell×Ncell in the table data 52bC, and then may perform adjustment control in accordance with voltage pulsation of the recorded capacitor voltage Vc-cell×Ncell.

Hereinafter, control allowance of the modulation commands karm* with respect to the capacitor voltage Vc-cell×Ncell will be described.

Figure 16:
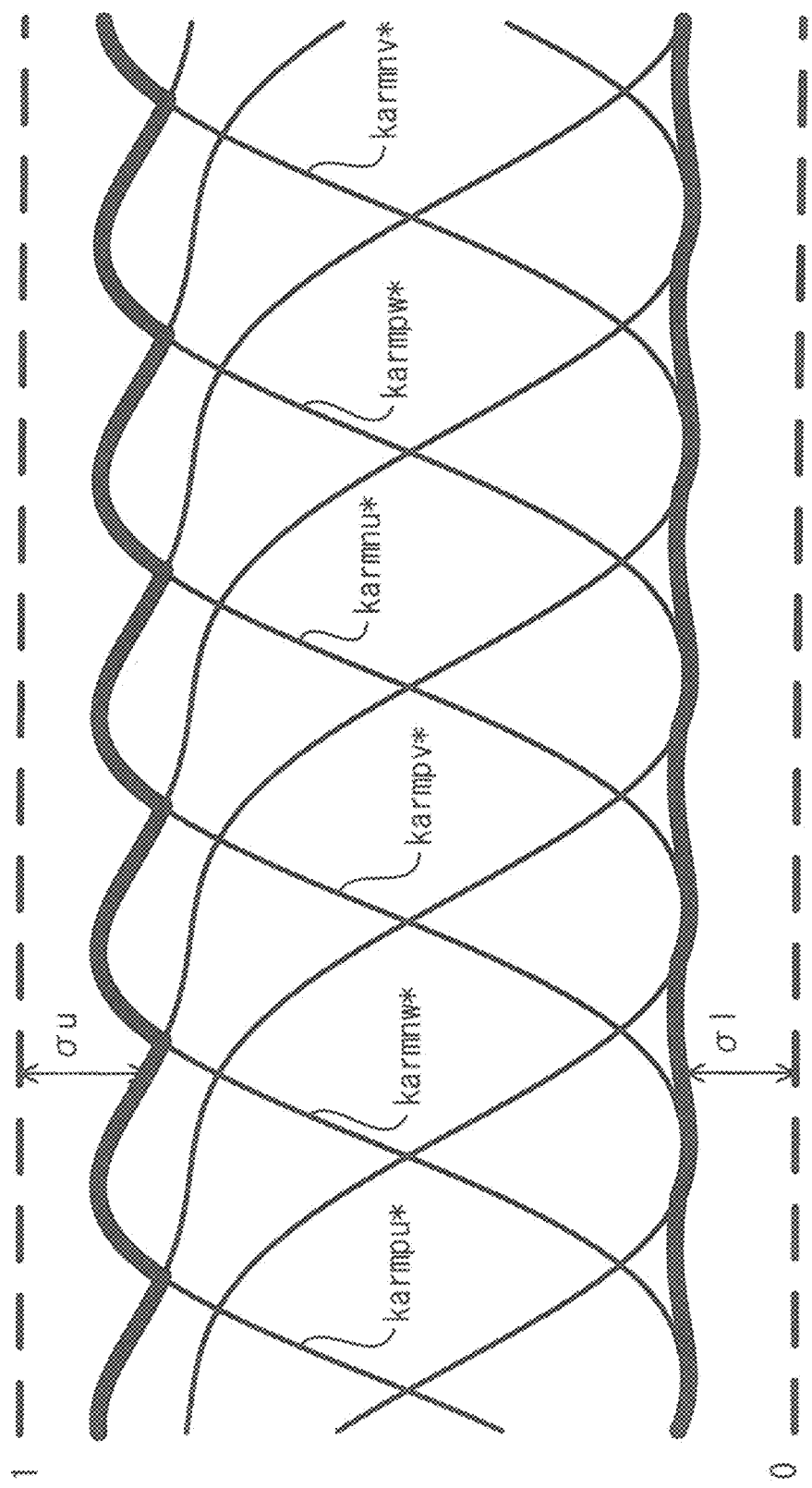
FIG. 16 illustrates control allowance of the power conversion device according to embodiment 1.

FIG. 16 shows the modulation commands karm* for the respective arms 10 after modulation correction of the modulation commands karm* in embodiment 1.

As described above, the modulation commands karm* are represented by the following Expression (8) for each arm.

$$karm^* = Varm^*/Vc \quad \text{(Expression 8)}$$

In a case where the converter cell 11 has a half-bridge-cell configuration shown in FIG. 2 or FIG. 3, overmodulation occur with 0≤karm*≤1.

With reference to FIG. 16, control allowance σ at a given instantaneous time is defined as follows.

$$\sigma u = 1 - \max(karmpu^*, karmnu^*, karmbw^*) \quad \text{(Expression 9)}$$

$$\sigma l = \min(karmpu^*, karmnu^* \, karmnw^*) \quad \text{(Expression 10)}$$

$$\sigma = \min(\sigma u, \sigma\sigma l) \quad \text{(Expression 11)}$$

Here, max ( ) and min ( ) are functions that take the maximum value and the minimum value of variables in parentheses, respectively.

Figure 17:
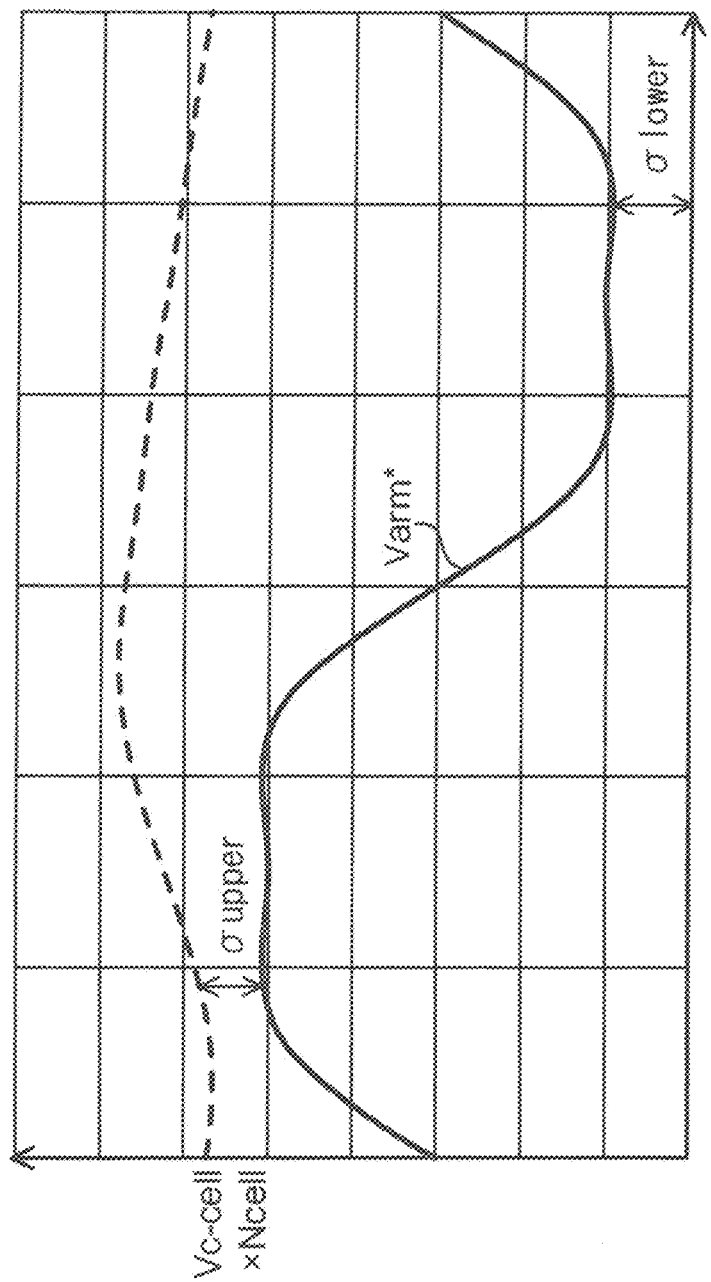
FIG. 17 illustrates control allowance of the power conversion device according to embodiment 1.

FIG. 17 is a waveform diagram showing the arm voltage command Varm* in the power conversion device 100 of embodiment 1.

In FIG. 17, control allowance as a first deviation between the maximum value of the arm voltage command Varm* and the capacitor voltage Vc-cell×Ncell which is the upper limit value of the modulation command is defined as control allowance upper (=(Vc-cell×Ncell)−karm).

In addition, control allowance as a second deviation between the minimum value of the arm voltage command Varm* and 0 which is the lower limit value of the limit value of the modulation command is defined as control allowance lower (=karm).

In the waveform diagram shown in FIG. 17, when the minimum value of the control allowance upper and the minimum value of the control allowance lower in one cycle of the AC voltage of the AC power supply 2 are compared, the control allowance upper is smaller than the control allowance lower.

Figure 18:
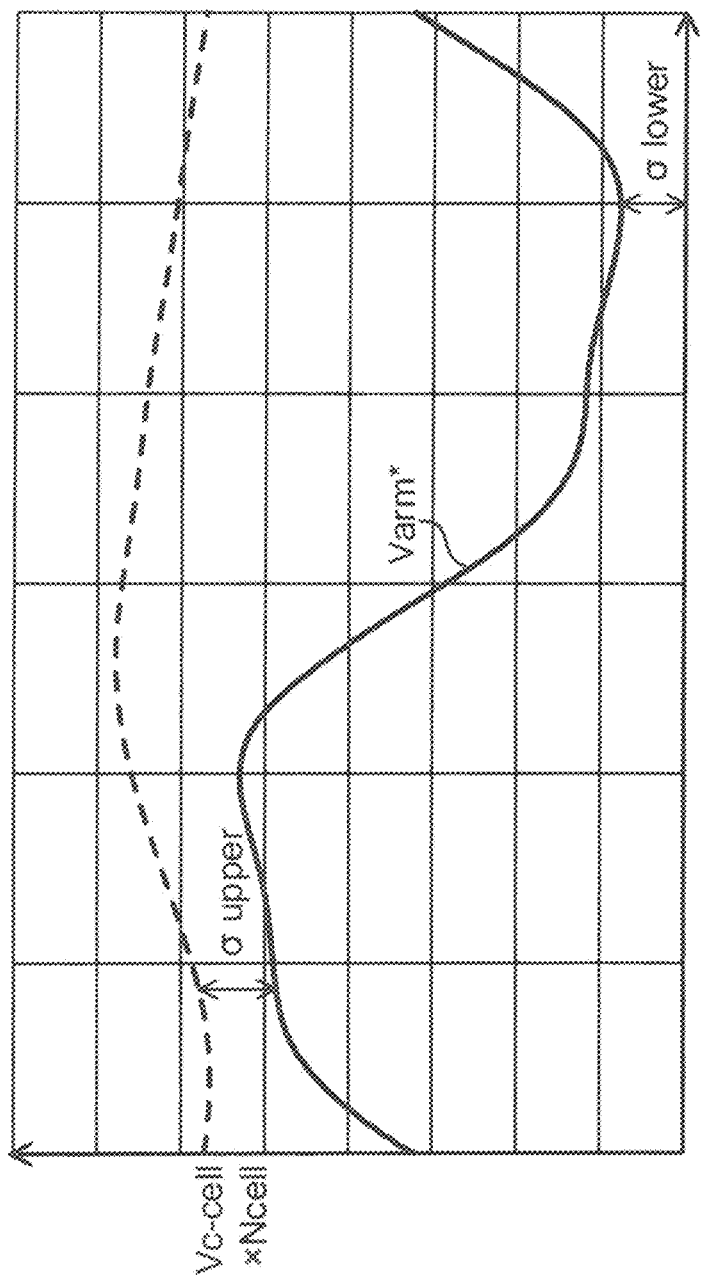
FIG. 18 illustrates control allowance of the power conversion device according to embodiment 1.

FIG. 18 is a waveform diagram showing the arm voltage command Varm* in the power conversion device 100 of embodiment 1, and shows a case of shifting the phase of the zero-phase-sequence voltage command value Vo* shown in FIG. 17.

In this case, when the minimum value of the control allowance upper and the minimum value of the control allowance lower are compared, the control allowance upper is greater than the control allowance lower.

As shown in FIG. 17 and FIG. 18, when adjustment control for shifting the phase of the zero-phase-sequence voltage command value Vo* is performed, the magnitude relationship between the control allowance upper and the control allowance lower may be reversed.

In a multilevel converter in which a plurality of converter cells are connected in series in a multiplexed manner, switching noise due to semiconductor switching elements in the converter cells may increase. Therefore, in the multilevel converter, it is necessary to ensure that both of the control allowance upper and the control allowance lower are as great as possible. A condition that both of the control allowance upper and the control allowance lower are maximally ensured is a case where control allowance upper=control allowance lower is satisfied.

Therefore, the control device 50 of the power conversion device 100 of the present embodiment performs adjustment control so as to satisfy control allowance upper=control allowance lower. That is, the control device 50 performs adjustment control so that the control allowance upper and the control allowance lower each follow a value obtained by dividing, by 2, the sum of the value of the Control allowance upper and the value of the control allowance lower [(upper+lower)/2].

Figure 19:
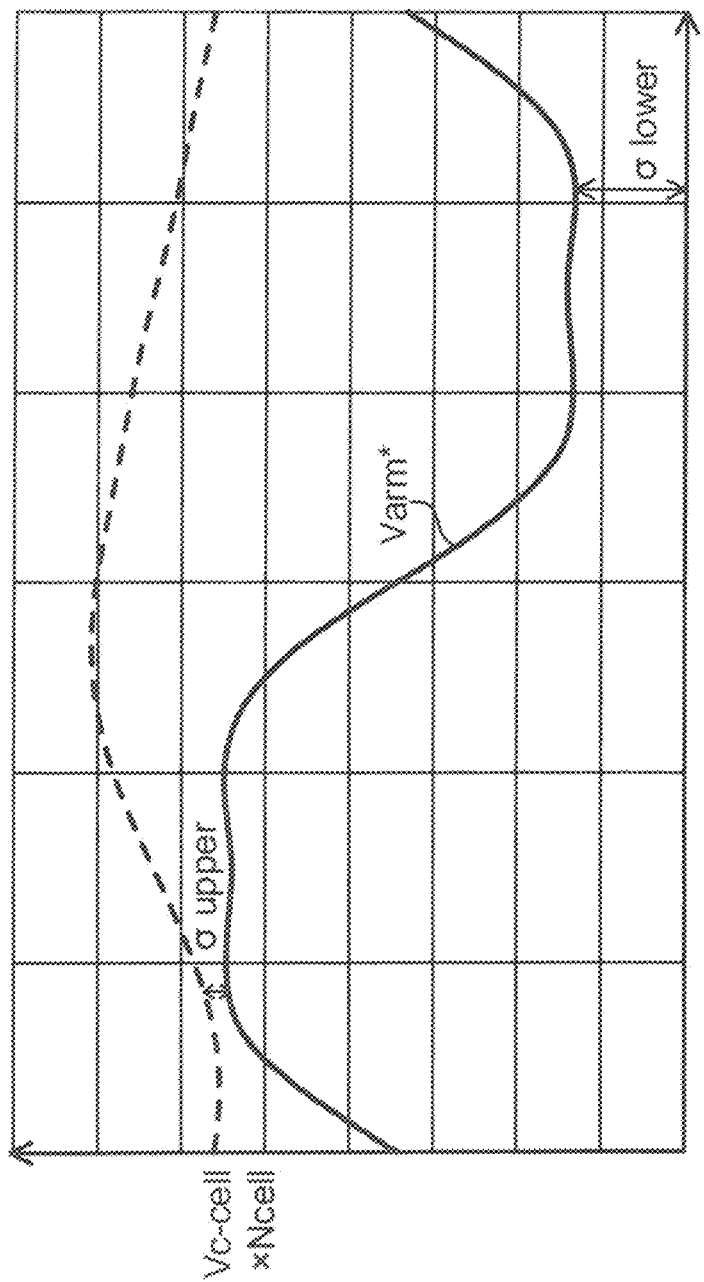
FIG. 19 illustrates control allowance of the power conversion device according to embodiment 1.

FIG. 19 is a waveform diagram showing the arm voltage command Varm* in the power conversion device 100 of embodiment 1, and shows case where the DC voltage component of the arm volt age command Varm* is great.

Figure 20:
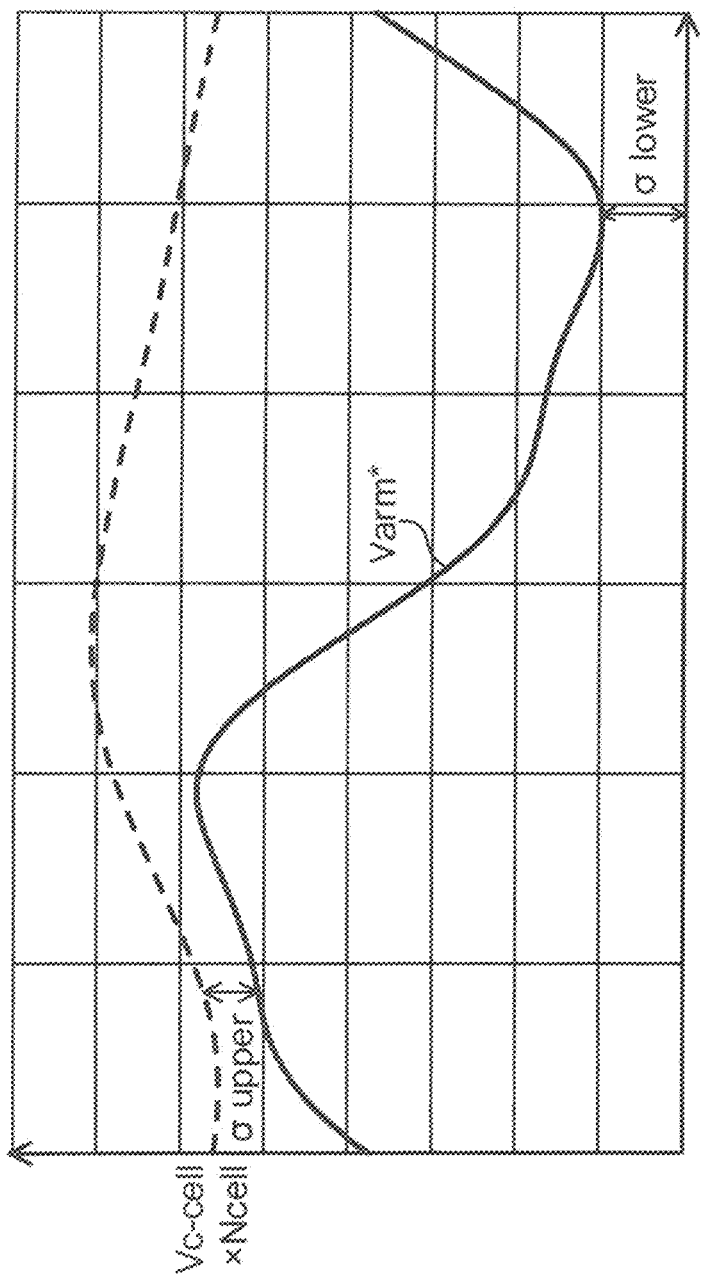
FIG. 20 illustrates control allowance of the power conversion device according to embodiment 1.
Figure 21:
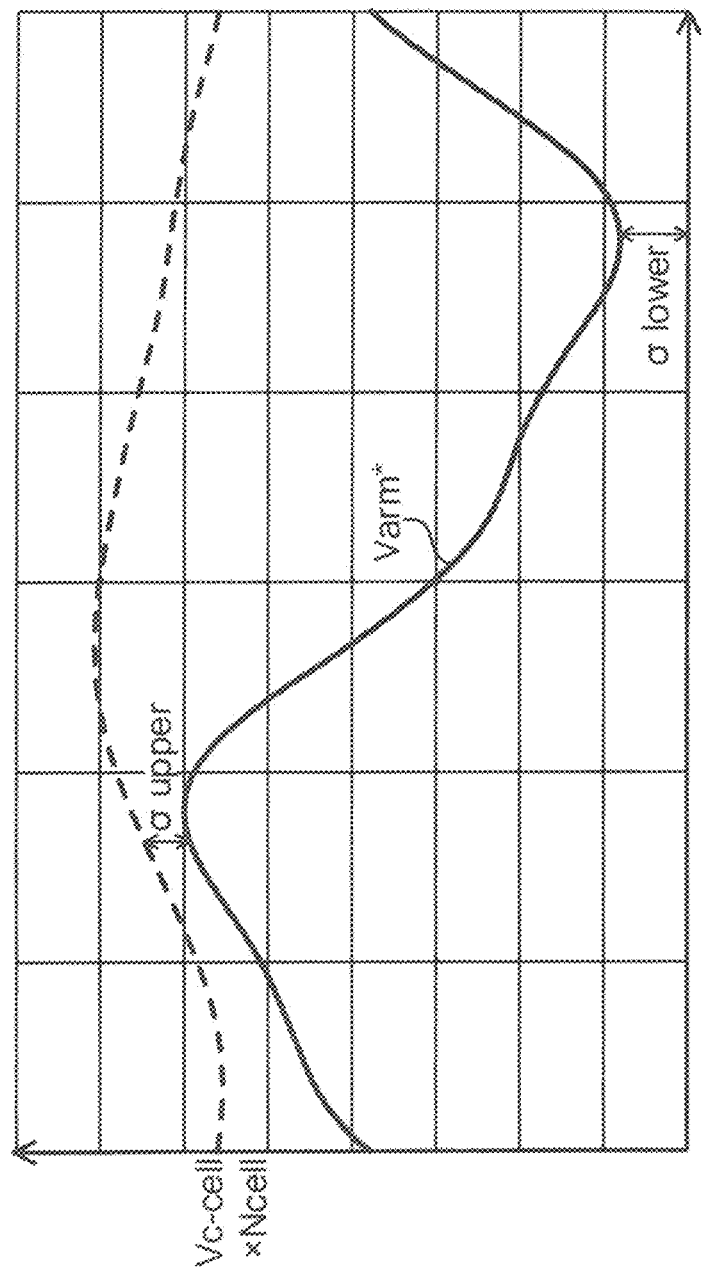
FIG. 21 illustrates control allowance of the power conversion device according embodiment 1.

FIG. 20 is a waveform diagram showing the arm voltage command Varm* in the power conversion device 100 of embodiment 1, and shows a case where the DC voltage component of the arm voltage command Varm* is small.

As shown in FIG. 19 and FIG. 20, there is a case where such adjustment control as to satisfy control allowance upper=control allowance lower cannot be performed, depending on the magnitude of the DC voltage component of the modulation command karm*. Therefore, for the above (upper+lower)/2, a set margin (first setting value) may be provided and adjustment control may be performed so that the control allowance upper and the control allowance lower each follow a value within [(upper+lower)/2+the first setting value].

Here, on the capacitor voltage of each converter cell 11, pulsation due to switching of switching elements is also superimposed in addition to pulsation of the capacitor voltage Ve-cell*Ncell. Therefore, the first setting value as a margin needs to be set to a margin in which such pulsation is considered. For example, the first setting value is set to a value not smaller than voltage pulsation due to switching elements.

With such control, maximum-width control allowances can be obtained for the control allowance upper and the control allowance lower. The fact that "the amplitude or the phase of the zero-phase-sequence voltage command value Vo* is adjusted to an appropriate value, whereby voltage that each arm 10 can output is increased as compared to the reference examples" as described above has the same meaning as that σ increases as described above.

With control as described above, reliability of the power conversion device 100 can be improved and operation thereof can be stabilized.

Fox the active power and the reactive power to be used in the above adjustment control, command values of the active power and the reactive power may be used.

As the AC voltage to be used in the above adjustment control, information about the amplitude and the phase of the AC voltage may be used. When the AC voltage changes, the capacitor voltage also changes and the arm voltage command value also changes. Therefore, by performing adjustment control for the zero-phase-sequence voltage in accordance with the amplitude and the phase of the AC voltage, the adjustment control can be performed more appropriately, whereby it becomes possible to obtain a great control effect.

In the above adjustment control, a DC voltage command value for controlling DC voltage of the power converter may be used. By performing the adjustment control considering a DC current component in the arm voltage command, it becomes possible to perform adjustment for control allowance more appropriately.

The power conversion device of the present embodiment configured as described above includes: a power converter including, for respective phases of AC, leg circuits each including a pair of arms connected in series to each other, the arms each including a plurality of converter cells which are connected in series and each of which has an energy storage element and a plurality of semiconductor elements, the leg circuits being connected in parallel between positive and negative DC terminals, the power converter being configured to perform power conversion between multiphase AC and DE; and a control unit for controlling the power converter. The control unit corrects an AC voltage command value for controlling AC voltage of the power converter, by a zero-phase-sequence voltage command value having a set amplitude and a set phase, and generates an arm modulation command for each arm on the basis of the corrected AC voltage command value and a DC voltage command value for controlling DC voltage of the power converter, to control each converter cell in the arm. The control unit performs adjustment control for adjusting at least either the amplitude or the phase of the zero-phase-sequence voltage command value on the basis of electric energy variation in the arm.

As described above, in the multilevel converter in which a plurality of converter cells each having an energy storage element are connected in series, adjustment control for adjusting at least either the amplitude or the phase of the zero-phase-sequence voltage command value is performed on the basis of electric energy variation in the arm. Thus, even in a case where voltage pulsation occurs in the capacitor voltage Vc-cell×Ncell representing the limit value of the modulation command, the corresponding arm can output a valve as indicated by the modulation command, whereby the energy storage elements can be downsized and the voltage usage ratio can be improved.

In the power conversion device of the present embodiment configured as described above, the control unit performs the adjustment control so that a value obtained by dividing the arm modulation command by a limit value of the arm modulation command derived on the basis of voltages of the energy storage elements in each arm becomes smaller than 1.

As described above, by performing the adjustment control so that the value obtained by dividing the modulation command by the limit value of the modulation command becomes smaller than 1, interference of the arm voltage command Varm* with the pulsating capacitor voltage Vc-cell×Ncell can be assuredly prevented, whereby operation stability of the power conversion device can be ensured.

In the power conversion device of the present embodiment configured as described above, the control unit shifts a phase of a maximum value of the arm modulation command by adjusting at least either the amplitude or the phase of the zero-phase-sequence voltage command value on the basis of the electric energy variation so that the maximum value of the modulation command does not interfere with the limit that is pulsating, thus performing the adjustment control so that the value obtained by dividing the arm modulation command by the limit value of the arm modulation command becomes smaller than 1.

As described above, the control device shifts the phase at which the modulation command karm* has the maximum value, whereby the maximum value of the arm voltage command Varm* can be assuredly prevented from interfering with the pulsating capacitor voltage Vc-cell×Ncell. Thus, operation stability of the power conversion device can be further ensured.

In the power conversion device of the present embodiment configured as described above, the control unit performs the adjustment control so that a first deviation between a maximum value of the arm modulation command and an upper limit value of the limit value, and a second deviation between a minimum value of the arm modulation command and a lower Limit value of the limit value, each become a value within [(a value of the first deviation+a value of the second deviation)/2+a first setting value]. The first setting value is et to a value not smaller than voltage pulsation due to switching of the semiconductor elements.

As described above, control is performed so that the first deviation and the second deviation each become a value within [(the value of the first deviation+the value of the second deviation)/2+the first set ng value], i.e., control allowance upper=control allowance lower is satisfied. Thus, by performing control so that both of the control allowance upper and the control allowance lower are ensured to be maximum allowances, it is possible to suppress the influence of switching noise in the multilevel converter in which a plurality of converter cells are connected in series in a multiplexed manner, whereby operation stability of the power conversion device can be further ensured.

In the power conversion device of the present embodiment configured as described above, the control unit derives a peak phase of an upper limit value of the limit value that is pulsating, on the basis of the electric energy variation in the arm, and performs the adjustment control so that the value obtained by dividing the arm modulation command by the limit value of the arm modulation command becomes smaller than 1, on the basis of the derived peak phase.

When voltage pulsation of the DC capacitors in the arm has the maximum value is when electric energy transferred through the arm is maximized, and when the pulsation has the minimum value is when electric energy transferred through the arm is minimized.

Therefore, by deriving the peak phase of the pulsating capacitor voltage Vc-cell×Ncell the basis of electric energy variation, the control device can select appropriate values of the amplitude adjustment coefficient X and the adjustment angle θ for the zero-phase-sequence voltage command value Vo* such that the arm voltage command Varm* does not interfere with the derived pulsation of the Capacitor voltage Vc-cell×Ncell.

In the power convers device of the present embodiment configured as described above, in the adjustment control, the control unit derives instantaneous power in the arm, and using the instantaneous power, derives the peak phase of the upper limit value of the limit value that is pulsating.

The phases at which the electric energy variation value of the arm has the maximum value and the minimum value can be derived by detecting the operation state of the power converter when the instantaneous power becomes 0. Thus, by deriving the peak phase of pulsation of the capacitor voltage Vc-cell×Ncell on the basis of the instantaneous power of the arm, it becomes possible to select appropriate values of the amplitude adjustment coefficient X and the adjustment angle θ for the zero-phase-sequence voltage command value Vo* such that the arm voltage command Varm* does not interfere with the derived pulsation of the capacitor voltage Vc-cell×Ncell.

In the power conversion device of the present embodiment configured as described above, in the adjustment control, the control unit derives a relational expression f(φ, Vac, Iac, Idc, Vdc) representing the instantaneous power in the arm and including, as variables, a phase angle φ of instantaneous current with respect to instantaneous voltage in the arm, AC voltage Vac of the AC, AC current Iac of the AC, DC current Idc flowing through the DC terminal, and DC voltage Vdc between the positive and negative DC terminals, and calculates the variables when the relational expression f(φ, Vac, Iac, Idc, Vdc)=0 is satisfied, thus deriving the variables at the phase at which upper limit value of the limit value that ag becomes a peak.

As described above, by deriving the instantaneous power of the arm as the relational expression f(φ, Vac, Iac, Idc, Vdc) and calculating the variables so as to satisfy the relational expression f(φ, Vac, Iac, Idc, Vdc)=0, it is possible to derive the variables at the phase at which the upper limit value of the capacitor voltage Vc-cell×Ncell that is pulsating becomes a peak. Thus, on the basis of the variables detected when the power conversion device is actually operated, pulsation of the capacitor voltage Vc-cell×Ncell can be estimated and adjustment control can be accurately performed.

In the power ci version device of the present embodiment configured as described above, the control unit has recorded therein a plurality of values of at least either the amplitude of the phase of the zero-phase-sequence voltage command value such that the value obtained by dividing the arm modulation command by the limit value of the arm modulation command becomes smaller than 1. The control unit has recorded therein values of active power P of the power converter, reactive power Q of the power converter, AC voltage Vac, DC voltage Vdc, AC current Iac, and DC current Idc corresponding to the plurality of recorded values of at Least either the amplitude or the phase. In the adjustment control, the control unit selects the recorded value of at least either the amplitude or the phase such that the value obtained by dividing the arm modulation command by the limit value of the arm modulation command becomes smaller than 1, on the basis of a detected value of at least one of the active power P of the power converter, the reactive power Q of the power converter, the AC voltage Vac, the DC voltage Vdc, the AC current Iac, or the DC current Idc, and uses the selected value for the adjustment control, As described above, the control device has recorded therein a plurality of values of the amplitude or the phase of the zero-phase-sequence voltage command value such that the value obtained by dividing the modulation command by the limit value of the modulation command becomes smaller than 1. Further, the control device has recorded therein values of the active power P, the reactive power Q, the AC voltage Vac, the DC voltage Vdc, the AC current Iac, and the DC current Id corresponding to the plurality of recorded values of the amplitude or the phase.

Thus, on the basis of at least one of the active power P, the reactive power Q, the AC voltage Vac, the DC voltage Vdc, the AC current Iac, or the DC current Idc detected when the power conversion device is actually operated, the recorded optimum values of the amplitude and the phase can be selected and used for adjustment control.

In the power conversion device of the present embodiment configured as described above, the control unit derives an approximate expression representing a change rate of the recorded values of at least either the amplitude or the phase corresponding to the recorded values of the active power P of the power converter, the reactive power Q of the power converter, the AC voltage Vac, the DC voltage Vdc, the AC current Iac, and the DC current Idc, and performs the adjustment control in accordance with the approximate expression.

As described above, an approximate expression representing the change rate of the amplitude or the phase corresponding to detection values detected when the power conversion device is actually operated is derived in advance. Then, by performing adjustment control on the basis of the approximate expression, adjustment control can be accurately performed.

In the power conversion device of the present embodiment configured as described above, an the adjustment control, the control unit uses at least one of the amplitude of the AC voltage Vac, the phase of the AC voltage Vac, or the DC voltage command value for controlling the DC voltage of the rower converter.

As described above, by performing adjustment control for the zero-phase-sequence voltage in accordance with the amplitude and the phase of the AC voltage, it becomes possible to perform more accurate adjustment control on the basis of change in the capacitor voltage according to change in the AC voltage, In addition, by using the DC voltage command value for controlling the DC voltage of the power converter, adjustment control is performed considering a DC current component in the modulation command, whereby control allowance can be adjusted more appropriately.

In the power conversion device of the present embodiment configured as described above, the zero-phase-sequence voltage command value has a frequency obtained by multiplying a fundamental frequency of the multiphase AC by an odd-number multiple of a number of the phases of the multiphase AC.

By using the zero-phase-sequence voltage command value having such a frequency, the voltage usage ratio can be improved and the grid side can be prevented from being influenced when correction is performed by the zero-phase-sequence voltage command value.

Embodiment 2

Hereinafter, embodiment 2 of the present disclosure will be described with reference to the drawings, focusing on difference from the above embodiment 1. The same parts as those in the above embodiment 1 are denoted by the same reference characters and the description thereof is omitted.

Figure 22:
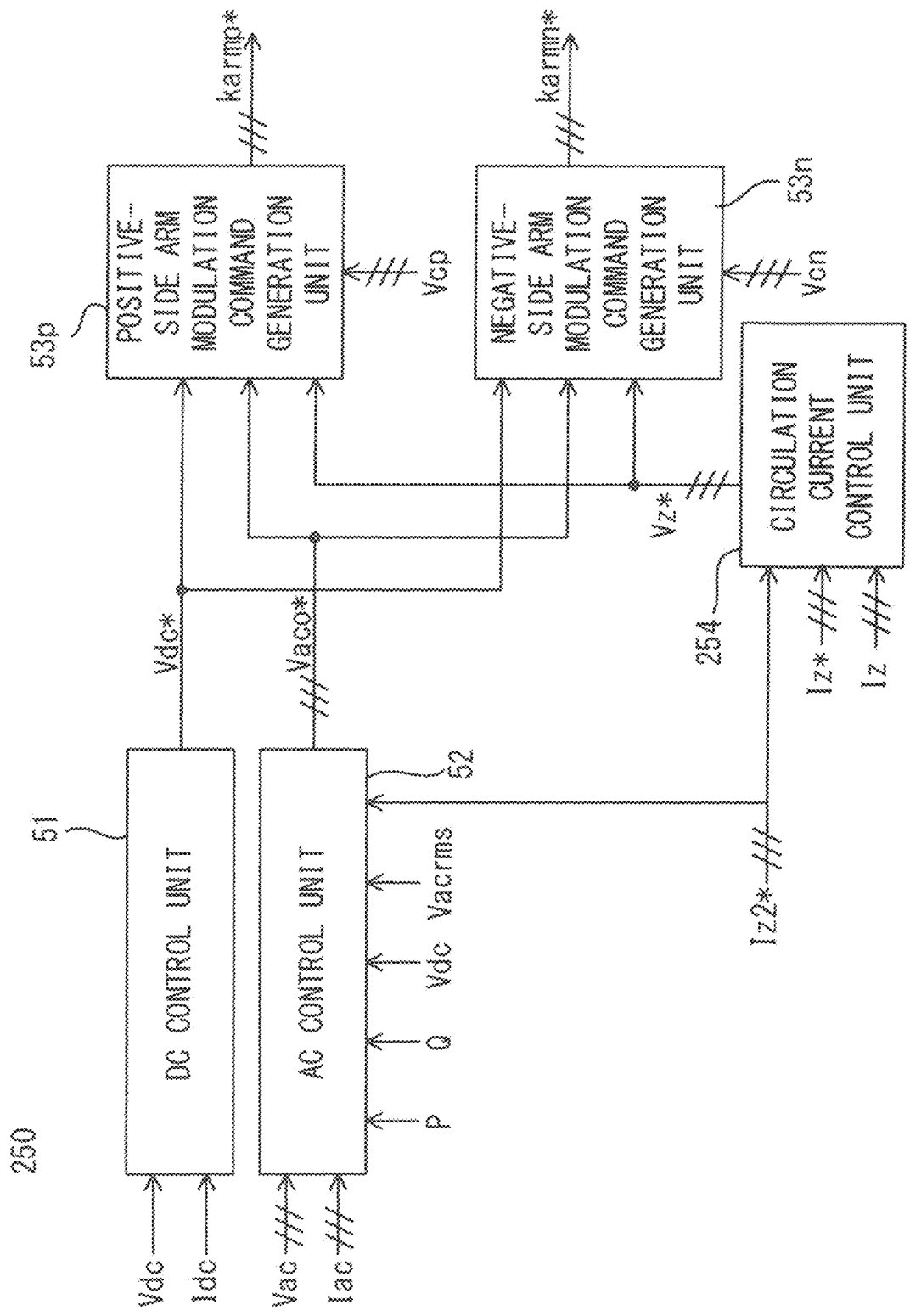
FIG. 22 shows a configuration of a preceding-stage part of a control device according to embodiment 2.

FIG. 22 shows a configuration of a preceding-stage part of a control device 250 according to embodiment 2.

In embodiment 1, the circulation current control unit 54 performs control so that the circulation current Iz circulating among the legs 9 follows the circulation current command value Iz*.

In embodiment 2, a circulation current control, unit 254 performs control, so that the circulation current Iz follows a value obtained by adding the circulation current command value Iz* and a new circulation current command value Iz2*.

The new circulation current command value Iz2* has a sinewave with a frequency component that is an even-number multiple of the fundamental frequency f of the AC power supply 2. In the present embodiment, as a representative, the circulation current command value Iz2* is assumed to have a sinewave with a frequency component that is two times the fundamental frequency f of the AC power supply 2. In a case where the circulation current Iz perfectly follows the circulation current command value Iz2*, i.e., in a case where Iz is 0, the circulation current Iz is represented by the following (Expression 12).

$$Iz = Izp \times \cos(2\omega w) \quad \text{(Expression 12)}$$

Accordingly, the instantaneous power parmpu of the u phase positive-side arm 10uP is deformed from (Expression 6) as follows.

$$parmpu = Varmrpu \times (Iarmpu + Izu) = Vacu \times Iacu/2 - Vacu \times Idc/3 - Vdc \times Iacu/2 + Vdc \times Idc/6 + Vo \times (-Iac/2 + Idc/3) + Vacu \times Izu + Vo \times Izu + Vdc \times Izu/2 = 2/\sqrt{3} \times Vacrms \times Iacrms \times \sin(\omega t + \varphi) \times \sin(\omega t) - 1/3 \times \sqrt{(2/3)} \times Vacrms \times Idc \times \sin(\omega t) - 1/\sqrt{2} \times Fdc \times Iacrms \times \sin(\omega t + \varphi) + Vdc \times Idc/6 + 2/\sqrt{3} \times Vacrms \times Izp \times \sin(\omega t) \times \cos(2\omega t) + 1/2 \times Vdc \times Izp \times \cos(2\omega t) = 1/\sqrt{3} \times Vacrms \times Iacrms \times (\cos \varphi - \cos(2\omega t + \varphi)) - 1/3 \times \sqrt{(2/3)} \times$$

$Vacrms \times Idc \times \sin(\omega t) - 1\sqrt{2} \times Vdc \times Iacrms \times \sin(\omega t+$
$\varphi) + Vdc \times Idc/6 + 1/\sqrt{3} \times Vacrms \times Izp \times (\sin(3\omega t) \times \sin$
$(\omega t)) + 1/2 \times Vdc \times Izp \times \cos(2\omega t) = 1/\sqrt{3} \times Vacrms \times$
$Iacrms \times (\cos \varphi - \cos(2\omega t+\varphi)) - (1/3 \times \sqrt{(2/3)} \times$
$Vacrms \times Idc + 1/\sqrt{3} - Vacrms \times Izp) \times \sin(\omega t) - 1/\sqrt{2} \times$
$Vdc \times Iacrms \times \sin(\omega t+\varphi) + Vdc \times Idc/6 + 1/\sqrt{3} \times$
$Vacrms \times Izp \times \sin(3\omega t) + 1/2 \times Vdc \times Izp \times \cos(2\omega t)$  (Expression 13)

As shown by the above (Expression 13), it is found that the circulation current Iz including a sinewave with a frequency component that is two times the fundamental frequency f of the AC power supply 2 has an influence on a frequency component that is one times the fundamental frequency, a frequency component that is two times the fundamental frequency, and a frequency component that is three times the fundamental frequency in the arm instantaneous power parmpu for a phase on the positive side. Thus, the circulation current Iz including a sinewave with a frequency component that is two times the fundamental frequency f of the AC power supply 2 flows among the legs 9, whereby pulsation of the voltage value Vcap of the DC capacitor 13 in each arm 9 is reduced. However, due to increase in the circulation current Iz, the effective value of the arm current Iarm increases, so that loss in the switching elements increases. Therefore, there is limitation in performing control for preventing interference of the arm voltage command Varm* with pulsation of the capacitor voltage Vc-cell×Ncell by only increasing the circulation current Iz as described above.

In the case where circulation current having a frequency that is two times the fundamental frequency f of the AC power supply 2 is added to a certain extent so as to reduce voltage pulsation of the DC capacitors 13, the phases at which voltage pulsation of the DC capacitors has the maximum value and the minimum value also change.

Accordingly, the control device 250 performs adjustment control for adjusting at least either the amplitude or the phase of the zero-phase-sequence voltage command value Vo*, by using the optimum value of at least either the amplitude adjustment coefficient X or the adjustment angle θ when the circulation current that is two times the fundamental frequency f of the AC power supply 2 flows, derived on the basis of the electric energy variation value ΔWarmpu in the arm 10 and recorded in the table data 52*b*C.

Hereinafter, the effect of adjustment control in embodiment 2 will be described, using a power conversion device in a reference example.

Figure 23:
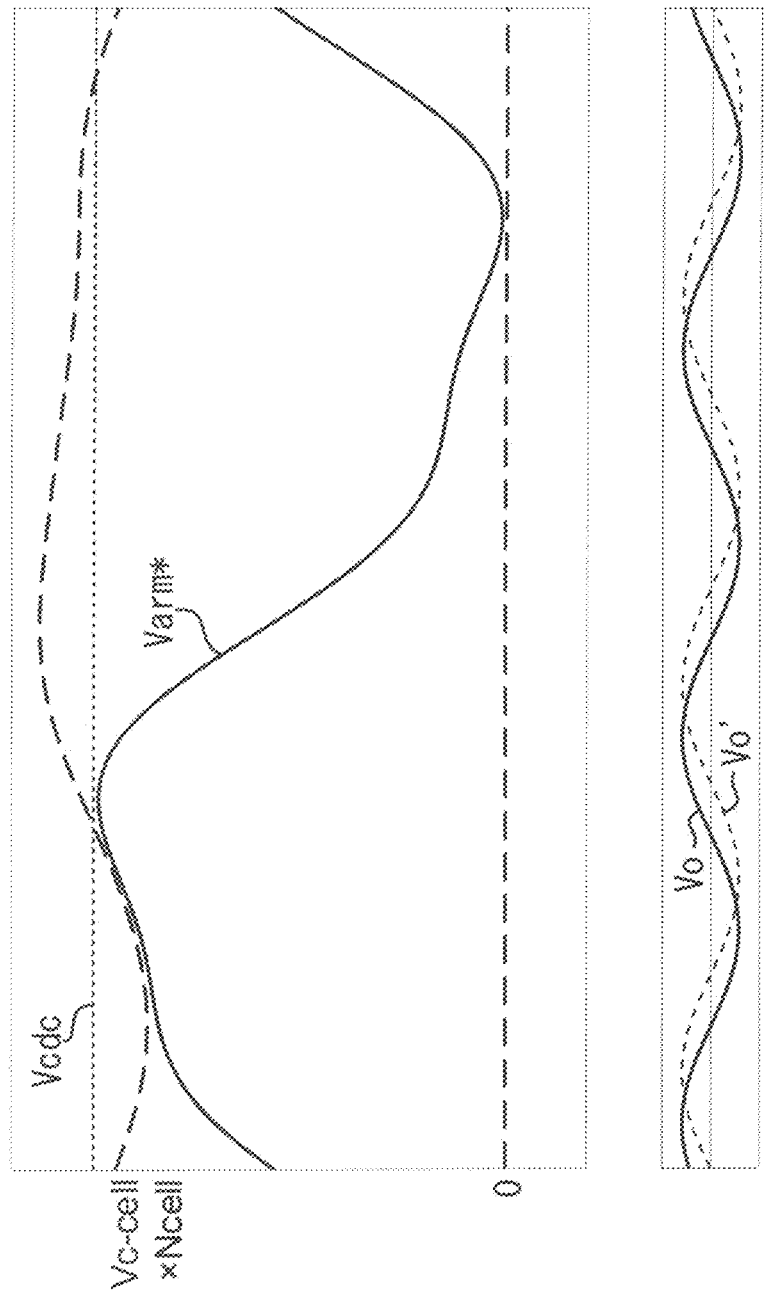
FIG. 23 shows operation waveforms in a power conversion device according to embodiment 2.

FIG. 23 shows a waveform of the arm voltage command Varm* in the power conversion device 100 of embodiment 1 in a case of performing correction by the zero-phase-sequence voltage command value Vo* in adjustment control without supplying the circulation current Iz that is two times the fundamental frequency of the AC power supply 2.

FIG. 23 shows that the arm voltage command Varm-does not become greater than the capacitor voltage Vc-cell×Ncell when the zero-phase-sequence voltage command value Vo* is set to have appropriate amplitude and phase as described in embodiment. Under this condition, a case where the circulation current Iz that is two ties the fundamental frequency f of the AC power supply 2 flows will be shown below with reference to FIG. 24.

Figure 24:
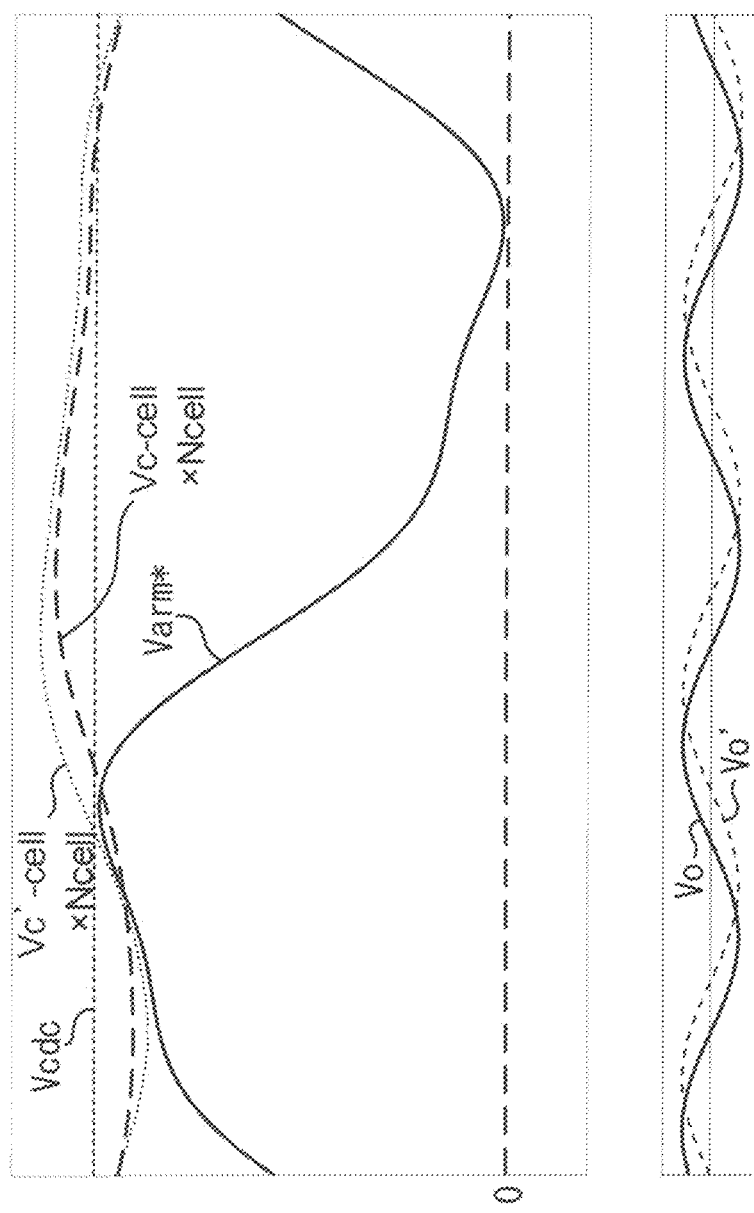
FIG. 24 shows operation waveforms in the power conversion device according embodiment 2.

FIG. 24 shows a waveform of the arm voltage command Varm* in a power conversion device in reference example 5 configured such that the circulation current Iz having a frequency component that is two times the fundamental frequency f of the AC power supply 2 flows in the power conversion device 100 of embodiment 1 shown in FIG. 23.

In FIG. 24, the capacitor voltage when the above circulation current Iz does not flow is shown as Vc'-cell×Ncell, and the capacitor voltage when the above circulation current Iz flows is shown as Vc-cell×Ncell.

As shown in FIG. 24, it is found that, as compared to the capacitor voltage Vc'-cell×Ncell, the magnitude: of pulsation of the capacitor voltage Vc-cell×Ncell when the above circulation current Iz flows is reduced. However, as described above, as a result of the circulation current Iz flowing, the phases of the top and the bottom (maximum value and minimum value) of pulsation of the capacitor voltage Vc-cell×Ncell change. Therefore, if adjustment control is performed in the same manner as in embodiment 1, there is a part where the arm voltage command Varm* becomes greater than the capacitor voltage Vc-cell×Ncell.

Figure 25:
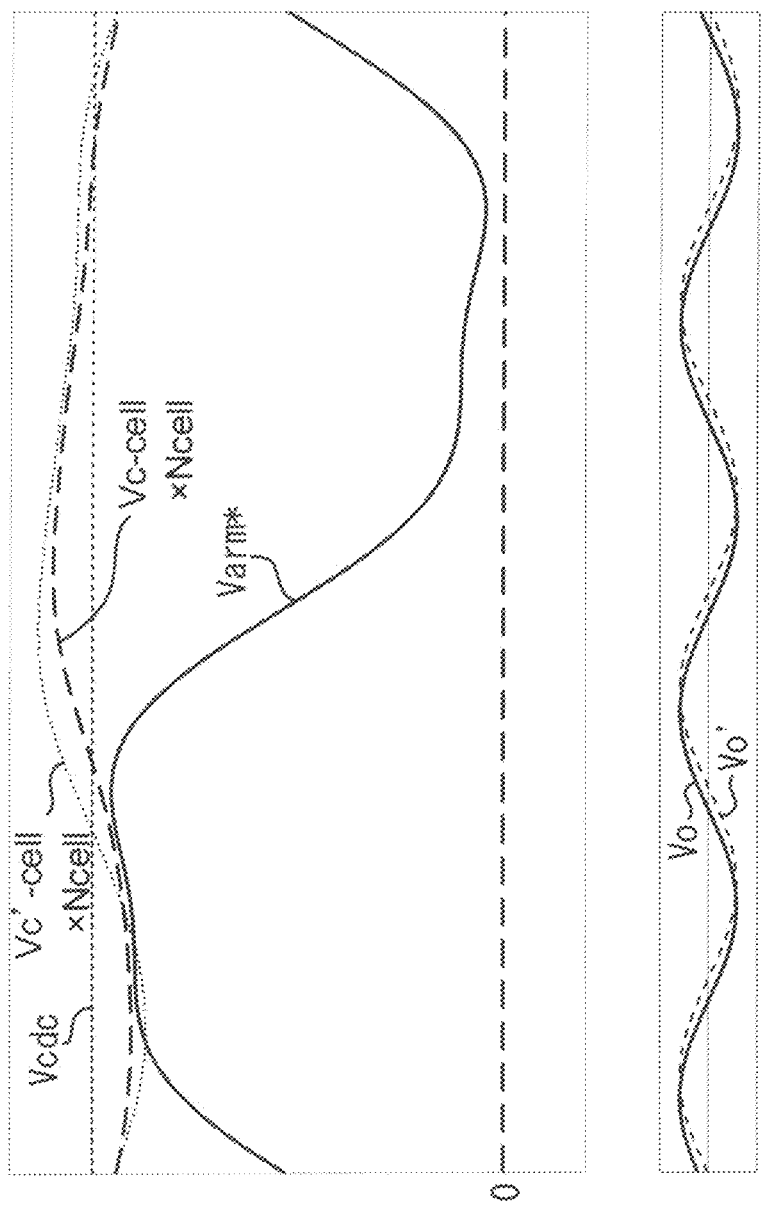
FIG. 25 shows operation waveforms in the power conversion device according to embodiment 2.

FIG. 25 shows a waveform of the arm voltage command Varm* in the power conversion device of embodiment 2. In FIG. 25, the same circulation current Iz as in the power conversion device 100 in reference example 5 shown in FIG. 24 flows. Further, in adjustment control, the recorded optimum value of at least either the amplitude adjustment coefficient X or the adjustment angle θ when the circulation current that z, is two times the fundamental frequency f of the AC power supply 2 flows, is used.

As described above, with respect to the circulation current Iz or the command values Iz*, Iz2*, in accordance with the amplitude and the phase thereof, the optimum amplitude adjustment coefficient X and adjustment angle θ are used to change the zero-phase-sequence voltage communard value Vo*. Thus, even when the circulation current Iz flows, the arm voltage command Varm* does not become greater than the capacitor voltage Vc-cell×Ncell. Therefore, the corresponding am 10 can output a value as indicated by the arm voltage command Varm*.

In the present embodiment, as a command value for circulation current for reducing capacitor voltage pulsation, only the circulation current command value Iz2* including a sinewave with a frequency that is two times the fundamental frequency of the AC power supply 2 is used. However, considering the periodicity of the waveform of the above sinewave and the configurations of the arms 10, if the circulation current Iz has a frequency that is an even-number multiple and is not a multiple of three with respect to the fundamental frequency of the AC power supply 2, voltage pulsations of the X capacitors 23 in all the arms 10 are merely different in phases and all have the same waveform.

Therefore, control may be performed using such a circulation current command value Iz2* as to produce the circulation current Iz having a frequency that is an even-number multiple and is not a multiple of three with respect to the fundamental frequency, and the amplitude and the phase of the zero-phase-sequence voltage command value Vo* may be changed accordingly.

In the power conversion device of the present embodiment configured as described above, the control unit controls circulation current circulating among the leg circuits for the respective phases, on the basis of a circulation current command value having a frequency component that is an even-number multiple and is not a multiple of three with respect to a fundamental frequency of the multiphase AC. The control unit performs the adjustment control on the basis of the electric energy variation in the arm that is based on the circulation current command value.

By supplying the circulation current having such a frequency and performing adjustment control in accordance with pulsation of the capacitor voltage Vc-cell×Ncell due to the circulation current, voltage ripple in the DC capacitors 23 is suppressed and increase in switching loss is suppressed while sufficient control allowance is ensured, whereby the voltage usage ratio can be improved.

For the circulation current to be used in the adjustment control, information about the amplitude and the phase of the circulation current command value may be used. Thus, the adjustment control performed in accordance with pulsation of the capacitor voltage Vc-cell×Ncell changing due to the circulation current can be performed more accurately.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure, It is therefore understood that numerous modifications which have not been exemplified can be devised without departing from the scope of the present disclosure. For example, at least one of constituent components May be modified, added, or eliminated.

DESCRIPTION OF THE REFERENCE CHARACTERS 1 power converter
9u, 9v, 9w leg circuit
10, 10uP, 10vP, 10wP, 10uN, 10vN, 10wN arm
11 converter cell
12U, 12L semiconductor switching element (semiconductor element)
13 DC capacitor (energy storage element)
50, 250 control device (control unit)

The invention claimed is:

1. A power conversion device comprising:
a power converter including, for respective phases of AC, leg circuits each including a pair of arms connected in series to each other, the arms each including a plurality of converter cells which are connected in series and each of which has an energy storage element and a plurality of semiconductor elements, the leg circuits being connected in parallel between positive and negative DC terminals, the power converter being configured to perform power conversion between multiphase AC and DC; and
a controlling circuitry for controlling the power converter, wherein
the controlling circuitry corrects an AC voltage command value for controlling AC voltage of the power converter, by a zero-phase-sequence voltage command value having a set amplitude and a set phase, and generates an arm modulation command for each arm on the basis of the corrected AC voltage command value and a DC voltage command value for controlling DC voltage of the power converter, to control each converter cell in the arm, the controlling circuitry is configured to, on the basis of electric energy variation in the arm, derive a limit value of the arm modulation command that is based on the energy storage elements in each arm and changes with a phase, and
the controlling circuitry performs adjustment control for adjusting at least either the amplitude or the phase of the zero-phase-sequence voltage command value, so that a value obtained by dividing the arm modulation command by the derived limit value of the arm modulation command becomes smaller than 1.

2. The power conversion device according to claim 1, wherein
the controlling circuitry shifts a phase of a maximum value of the arm modulation command by adjusting at least either the amplitude or the phase of the zero-phase-sequence voltage command value on the basis of the electric energy variation so that the maximum value of the arm modulation command does not interfere with the limit value that is pulsating, thus performing the adjustment control so that the value obtained by dividing the arm modulation command by the limit value of the arm modulation command becomes smaller than 1.

3. The power conversion device according to claim 1, wherein
the controlling circuitry performs the adjustment control so that a first deviation between a maximum value of the arm modulation command and an upper limit value of the limit value, and a second deviation between a minimum value of the arm modulation command and a lower limit value of the limit value, each become a value within [(a value of the first deviation+a value of the second deviation)/2+a first setting value], and the first setting value is set to a value not smaller than voltage pulsation due to switching of the semiconductor elements.

4. The power conversion device according to claim 1, wherein
the controlling circuitry derives a peak phase of an upper limit value of the limit value that is pulsating, on the basis of the electric energy variation in the arm, and performs the adjustment control so that the value obtained by dividing the arm modulation command by the limit value of the arm modulation command becomes smaller than 1, on the basis of the derived peak phase.

5. The power conversion device according to claim 4, wherein
in the adjustment control, the controlling circuitry derives instantaneous power in the arm, and using the instantaneous power, derives the peak phase of the upper limit value of the limit value that is pulsating.

6. The power conversion device according to claim 5, wherein in the adjustment control, the controlling circuitry
derives a relational expression $f(\varphi, Vac, Iac, Idc, Vdc)$ representing the instantaneous power in the arm and including, as variables, a phase angle $\varphi$ of instantaneous current with respect to instantaneous voltage in the arm, AC voltage Vac of the AC, AC current Iac of the AC, DC current Idc flowing through the DC terminal, and DC voltage Vdc between the positive and negative DC terminals, and
calculates the variables when the relational expression $f(\varphi, Vac, Iac, Idc, Vdc)=0$ is satisfied, thus deriving the variations at the phase at which the upper limit value of the limit value that is pulsating becomes a peak.

7. The power conversion device according to claim 1, wherein
the controlling circuitry has recorded therein a plurality of values of at least either the amplitude or the phase of the zero-phase-sequence voltage command value such that the value obtained by dividing the arm modulation command by the limit value of the arm modulation command becomes smaller than 1,
the controlling circuitry has recorded therein values of active power P of the power converter, reactive power Q of the power converter, AC voltage Vac, DC voltage Vdc, AC current Iac, and DC current Idc corresponding to the plurality of recorded values of at least either the amplitude or the phase, and in the adjustment control, the controlling circuitry selects the recorded value of at least either the amplitude or the phase such that the value obtained by dividing the arm modulation command by the limit value of the arm modulation command becomes smaller than 1, on the basis of a detected value of at least one of the active power P of the power converter, the reactive power Q of the power converter, the AC voltage Vac, the DC voltage Vdc, the AC current Iac, or the DC current Idc, and uses the selected value for the adjustment control.

8. The power conversion device according to claim 7, wherein the controlling circuitry derives an approximate expression representing a change rate of the recorded values of at least either the amplitude or the phase corresponding to the recorded values of the active power P of the power converter, the reactive power Q of the power converter, the AC voltage Vac, the DC voltage Vdc, the AC current Iac, and the DC current Idc, and performs the adjustment control in accordance with the approximate expression.

9. The power conversion device according to claim 7, wherein in the adjustment control, the controlling circuitry uses at least one of the amplitude of the AC voltage Vac, the phase of the AC voltage Vac, or the DC voltage command value for controlling the DC voltage of the power converter.

10. The power conversion device according to claim 1, wherein the controlling circuitry controls circulation current circulating among the leg circuits for the respective phases, on the basis of a circulation current command value having a frequency component that is an even-number multiple and is not a multiple of three with respect to a fundamental frequency of the multiphase AC, and the controlling circuitry performs the adjustment control on the basis of the electric energy variation in the arm that is based on the circulation current command value.

11. The power conversion device according to claim 2, wherein the controlling circuitry performs the adjustment control so that a first deviation between a maximum value of the arm modulation command and an upper limit value of the limit value, and a second deviation between a minimum value of the arm modulation command and a lower limit value of the limit value, each become a value within [(a value of the first deviation+a value of the second deviation)/2+a first setting value], and the first setting value is set to a value not smaller than voltage pulsation due to switching of the semiconductor elements.

12. The power conversion device according to claim 2, wherein the controlling circuitry derives a peak phase of an upper limit value of the limit value that is pulsating, on the basis of the electric energy variation in the arm, and performs the adjustment control so that the value obtained by dividing the arm modulation command by the limit value of the arm modulation command becomes smaller than 1, on the basis of the derived peak phase.

13. The power conversion device according to claim 3, wherein the controlling circuitry derives a peak phase of an upper limit value of the limit value that is pulsating, on the basis of the electric energy variation in the arm, and performs the adjustment control so that the value obtained by dividing the arm modulation command by the limit value of the arm modulation command becomes smaller than 1, on the basis of the derived peak phase.

14. The power conversion device according to claim 11, wherein the controlling circuitry derives a peak phase of an upper limit value of the limit value that is pulsating, on the basis of the electric energy variation in the arm, and performs the adjustment control so that the value obtained by dividing the arm modulation command by the limit value of the arm modulation command becomes smaller than 1, on the basis of the derived peak phase.

15. The power conversion device according to claim 12, wherein in the adjustment control, the controlling circuitry derives instantaneous power in the arm, and using the instantaneous power, derives the peak phase of the upper limit value of the limit value that is pulsating.

16. The power conversion device according to claim 13, wherein in the adjustment control, the controlling circuitry derives instantaneous power in the arm, and using the instantaneous power, derives the peak phase of the upper limit value of the limit value that is pulsating.

17. The power conversion device according to claim 14, wherein in the adjustment control, the controlling circuitry derives instantaneous power in the arm, and using the instantaneous power, derives the peak phase of the upper limit value of the limit value that is pulsating.

18. The power conversion device according to claim 15, wherein in the adjustment control, the controlling circuitry derives a relational expression $f(\varphi, Vac, Iac, Idc, Vdc)$ representing the instantaneous power in the arm and including, as variables, a phase angle $\varphi$ of instantaneous current with respect to instantaneous voltage in the arm, AC voltage Vac of the AC, AC current Iac of the AC, DC current Idc flowing through the DC terminal, and DC voltage Vdc between the positive and negative DC terminals, and calculates the variables when the relational expression $f(\varphi, Vac, Iac, Idc, Vdc)=0$ is satisfied, thus deriving the variations at the phase at which the upper limit value of the limit value that is pulsating becomes a peak.

19. The power conversion device according to claim 16, wherein in the adjustment control, the controlling circuitry derives a relational expression $f(\varphi, Vac, Iac, Idc, Vdc)$ representing the instantaneous power in the arm and including, as variables, a phase angle $\varphi$ of instantaneous current with respect to instantaneous voltage in the arm, AC voltage Vac of the AC, AC current Iac of the AC, DC current Idc flowing through the DC terminal, and DC voltage Vdc between the positive and negative DC terminals, and calculates the variables when the relational expression $f(\varphi, Vac, Iac, Idc, Vdc)=0$ is satisfied, thus deriving the variations at the phase at which the upper limit value of the limit value that is pulsating becomes a peak.

20. The power conversion device according to claim 17, wherein in the adjustment control, the controlling circuitry derives a relational expression f(φ, Vac, Iac, Idc, Vdc) representing the instantaneous power in the arm and including, as variables, a phase angle φ of instantaneous current with respect to instantaneous voltage in the arm, AC voltage Vac of the AC, AC current Iac of the AC, DC current Idc flowing through the DC terminal, and DC voltage Vdc between the positive and negative DC terminals, and calculates the variables when the relational expression f(φ, Vac, Iac, Idc, Vdc)=0 is satisfied, thus deriving the variations at the phase at which the upper limit value of the limit value that is pulsating becomes a peak.

* * * * *